(12) United States Patent
Iyer et al.

(10) Patent No.: US 9,730,269 B2
(45) Date of Patent: *Aug. 8, 2017

(54) METHOD AND SYSTEM FOR PARTITIONING WIRELESS LOCAL AREA NETWORK

(75) Inventors: Pradeep Iyer, Cupertino, CA (US); Santashil PalChaudhuri, Kolkata (IN)

(73) Assignee: Aruba Networks, Inc., Sunnyvale, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 13/414,405

(22) Filed: Mar. 7, 2012

(65) Prior Publication Data

US 2013/0201978 A1 Aug. 8, 2013

Related U.S. Application Data

(60) Provisional application No. 61/595,521, filed on Feb. 6, 2012.

(51) Int. Cl.
*H04W 84/12* (2009.01)
*H04L 12/46* (2006.01)
(Continued)

(52) U.S. Cl.
CPC ......... *H04W 84/12* (2013.01); *H04L 12/4675* (2013.01); *H04L 12/4679* (2013.01);
(Continued)

(58) Field of Classification Search
CPC ............. H04L 2012/56; H04L 12/4675; H04L 12/4679; H04L 61/2061; H04L 61/2076; H04W 84/12
See application file for complete search history.

(56) References Cited

U.S. PATENT DOCUMENTS 6,757,281 B1 * 6/2004 Irish .............................. 370/389
8,027,637 B1 * 9/2011 Bims .............................. 455/16
(Continued)

OTHER PUBLICATIONS

Iyer, P., et al.; "Non-Final Office Action cited in U.S. Appl. No. 13/414,548"; dated Aug. 15, 2016; 13 pages.
(Continued)

*Primary Examiner* — Walter Divito
(74) *Attorney, Agent, or Firm* — Brooks, Cameron & Huebsch, PLLC

(57) ABSTRACT

The present disclosure discloses a method and system for partitioning WLAN in order to separate network traffic from different WLANs. Specifically, a network device receives a packet from a client connected to a first network device on an access network. The network device then determines that the received packet is associated with a VLAN that is pre-configured on the first network device based on the access network to which the client is connected. Furthermore, the network device transmits the packet to a MAC layer switching device, which is not configured with the VLAN that is pre-configured on the network device. The packet includes one of a DHCP discovery message, an ARP request message, a unicast message, a multicast message, and a broadcast message. The unicast message will be transmitted to the second network device on the pre-configured VLAN prior to being transmitted to another network device outside the pre-configured VLAN.

19 Claims, 17 Drawing Sheets

(51) Int. Cl.
*H04L 29/12* (2006.01)
*H04L 29/08* (2006.01)

(52) U.S. Cl.
CPC .......... *H04L 67/1027* (2013.01); *H04L 67/14* (2013.01); *H04L 61/2061* (2013.01); *H04L 61/2076* (2013.01)

(56) References Cited

U.S. PATENT DOCUMENTS

| | | |
|---|---|---|
| 8,166,141 B1 | 4/2012 | Van Horne, III |
| 8,644,188 B1* | 2/2014 | Brandwine et al. .......... 370/254 |
| 2007/0223399 A1* | 9/2007 | Yang .................. H04L 12/4666 370/254 |
| 2010/0217882 A1* | 8/2010 | Yang ............................ 709/229 |
| 2011/0126278 A1* | 5/2011 | Volpano ......................... 726/15 |
| 2012/0093150 A1* | 4/2012 | Kini ............................... 370/389 |
| 2013/0086142 A1 | 4/2013 | Hampel et al. |

OTHER PUBLICATIONS

Iyer, P., et al.; "Non-final Office Action cited in U.S. Appl. No. 13/414,548"; dated Aug. 31, 2015; 19 pages.

* cited by examiner

| | Dest MAC 791 | Src MAC 792 | Dest IP 793 | Src IP 794 | ...... |
|---|---|---|---|---|---|
| Downstream Unicast Packet 771 | MAC$_{AP3}$ | MAC$_{WEBSITE}$ | 10.1.10.10 | 10.1.2.3 | ...... |
| Dest NAT 772 | MAC$_{AP3}$ | MAC$_{WEBSITE}$ | 192.168.11.1 | 10.1.2.3 | ...... |
| Downstream Unicast Packet 773 | MAC$_{AP1}$ | MAC$_{AP3}$ | 172.16.11.13 | 192.168.11.1 | ...... |
| Downstream Unicast Packet 774 | MAC$_{CLIENT}$ | MAC$_{AP1}$ | 192.168.11.23 | 172.16.11.13 | ...... |

METHOD AND SYSTEM FOR PARTITIONING WIRELESS LOCAL AREA NETWORK

RELATED APPLICATIONS

The present application claims priority from provisional application U.S. Application No. 61/595,521, filed on 6 Feb. 2012, by Pradeep Iyer and Santashil PalChaudhuri, the entire contents of which are incorporated by reference herein.

FIELD

The present disclosure relates to partitioning traffic in a wireless digital network. In particular, the present disclosure relates to partitioning traffic in a wireless local area network (WLAN) without virtual local area network (VLAN) creation.

BACKGROUND

Wireless digital networks, such as networks operating under current Electrical and Electronics Engineers (IEEE) 802.11 standards, are spreading in their popularity and availability. With such popularity, however, come problems of partitioning traffic in the wireless digital networks.

A VLAN is a group of hosts with a common set of requirements that communicate as if they were attached to the same broadcast domain, regardless of their physical location. A VLAN has the same attributes as a physical local area network (LAN), but it allows for end stations to be grouped together even if they are not located on the same network switch. Typically, VLAN memberships can be configured by a network administrator through software instead of physically relocating devices or connections. In a legacy network, users were assigned to networks based on geography and were limited by physical topologies and distances. However, VLANs can logically group networks so that the network location of users is no longer so tightly coupled to their physical location.

VLANs operate at the data link layer of the Open Systems Interconnection (OSI) model. Network administrators often configure a VLAN to map directly to an Internet Protocol (IP) network or sub-network in the network layer of the OSI model. A VLAN trunk typically refers to a network link carrying multiple VLANs, which are identified by labels (or VLAN tags) inserted into their packets. Such VLAN trunks usually run between tagged ports of VLAN-aware devices; and thus, they are often switch-to-switch or switch-to-router links rather than links to hosts. A router, which is a device functioning in the network layer, may serve as the backbone for network traffic transmitted across multiple different VLANs.

The protocol most commonly used in configuring VLANs is the IEEE 802.1Q standard. Under the IEEE 802.1Q standard, a network device performs explicit tagging—that is, the frame is tagged with VLAN information in a field. The frame header under the current IEEE 802.1Q standard contains a 4-byte tag, which includes a 2-byte tag protocol identifier (TPID) and a 2-byte tag control information (TCI). The TPID has a fixed value of 0x8100 that indicates that the frame carries the 802.1Q/802.1p tag information. Moreover, the TCI contains the following elements:

Three-bit user priority;
One-bit canonical format indicator (CFI);
Twelve-bit VLAN identifier (VID), which uniquely identifies the VLAN to which the frame belongs. The VID limits the number of VLANs on a given Ethernet network to 4,096.

Conventionally, VLANs are used in enterprise networks to separate a network into multiple logically separated networks. For example, these networks contain devices that should be contained in separate trust domains, yet simply separated by VLANs while still being connected to the same physical switch. Nevertheless, in order to create a VLAN for each network, a network administrator has to set up and configure the VLANs on the switches and routers in the network. Moreover, the network administrator also needs to configure a sub-network address scope for each VLAN on the DHCP server. However, configuring and manage VLANs can become complicated tasks. Thus, it may not always be practical to establish VLANs in enterprise networks.

Furthermore, in order to preserve backward compatibility with legacy devices, native VLANs are used to communicate with devices that do not support VLANs. Network traffic on native VLANs cannot be easily separated. Also, because native VLANs are typically untagged on the IEEE 802.1Q trunk ports, this can lead to security vulnerabilities in the network. For example, an attacker may craft an IEEE 802.1Q double-tagged packet with an inner VLAN tag and an outer VLAN tag, which is aimed at traversing across multiple VLANs.

In some enterprise networks, network enclaves are used to separate their network to help prevent against threats in one domain from spreading to another. A network enclave is a segment of an internal network that is defined by common security policies. It is necessary when the confidentiality, integrity, or availability of a set of resources differs from those of the general computational environment. The purpose of a network enclave is to restrict internal access to critical computing devices. In more security-conscious environments, these networks of different trust levels can be physically separated from each other. Nevertheless, network enclaves or security trust domains merely separate network resource accesses but not network traffic.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
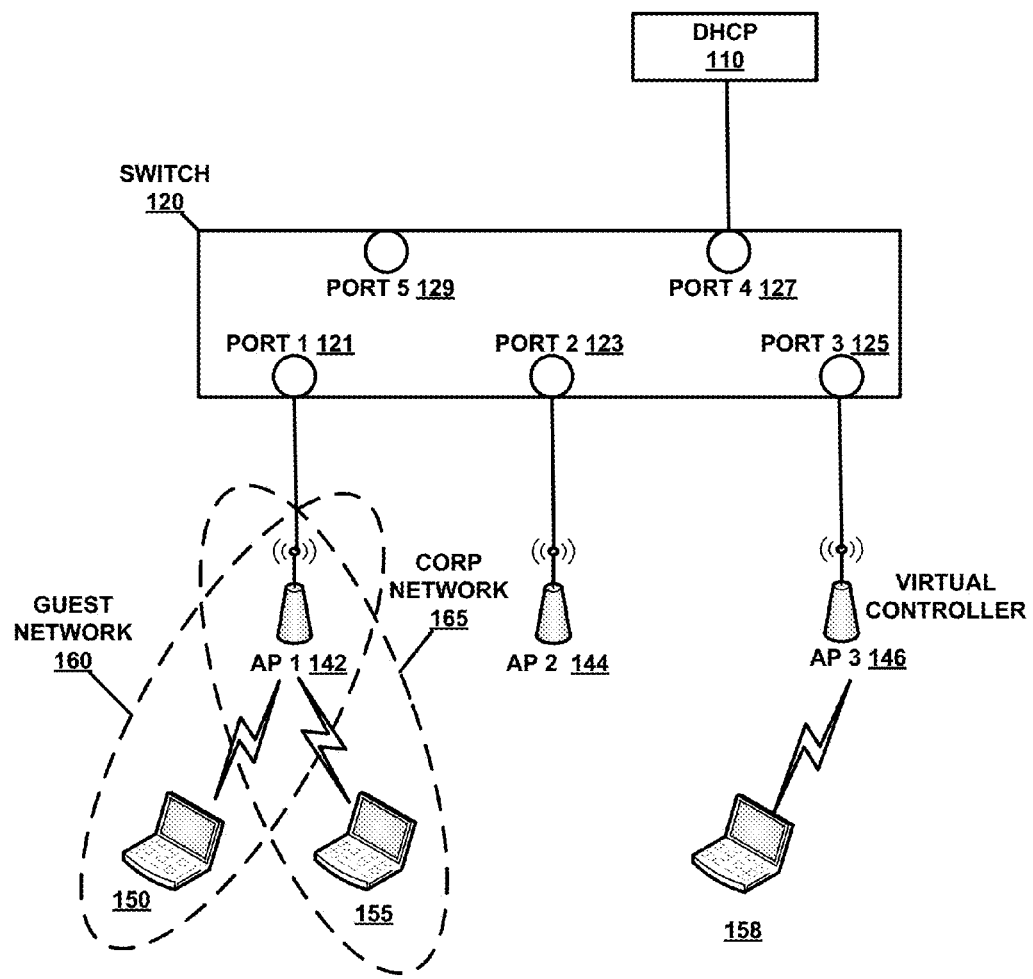
FIG. 1 shows an exemplary wireless network environment according to embodiments of the present disclosure.

In the following description, several specific details are presented to provide a thorough understanding. While the context of the disclosure is directed to WLAN partitioning mechanisms in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless local area networks in general, and traffic partitioning mechanisms in particular. Specifically, embodiments of the present disclosure for partitioning WLANs without the need to create a VLAN.

According to one aspect of the present disclosure, with the solution provided herein, the disclosed network device receives a packet from a client connected to the network device. The network device also determines that the received packet is associated with a VLAN that is pre-configured on the network device based on the access network to which the client is connected. Further, the network device transmits the packet to a Media Access Control (MAC) layer switching device. Note that, the pre-configured VLAN is not configured on the MAC layer switching device.

In some embodiments, the wireless network is associated with a unique basic service set identifier (BSSID).

In some embodiments, the client is connected to the network device via either a wired port or a wireless port.

The term "packet" constitutes any grouping of data in accordance with a series of bits or bytes having a prescribed format. In some embodiments, the packet includes an Internet Protocol (IP) address within a first IP sub-network address scope assigned to the client by another network device. Moreover, the other network device hosts a Dynamic Host Configuration Protocol (DHCP) service. Also, the other network device is assigned a different IP address within a non-overlapping IP sub-network address scope compared to the first IP sub-network address scope.

In some embodiments, the packet is transmitted on a native VLAN by the MAC layer switching device.

In some embodiments, the network device and the other network device belong to the same cluster of network devices, where each network device in the cluster provides a common subset of services for a plurality of clients.

In some embodiments, the other network device is configured as a default gateway for the clients connected to the cluster of network devices.

In some embodiments, the packet may be one of a DHCP discovery message, an ARP request message, a unicast message, a multicast message, and/or a broadcast message.

In some embodiments, the network device is configured to provide a DHCP relay service.

In some embodiments, the network device is configured to provide an ARP proxy service.

In some embodiments, the ARP request message includes a network layer address which corresponds to another network device that is different from the other network device.

In some embodiments, the unicast message is transmitted to the other network device on the pre-configured VLAN prior to being transmitted to another network device which is outside the pre-configured VLAN.

According to another aspect of the present disclosure, with the solution provided herein, the disclosed network device receives a downstream packet via a first connection session, wherein the downstream packet is associated with a VLAN that is pre-configured on the network device. Also, the network device retrieves a second connection session connecting a client and the first network device that is linked to the first connection session connecting the first network device and an external network device. Furthermore, the network device sets a Media Access Control (MAC) address corresponding to a second network device that the client is connected to as a destination MAC address in the downstream packet. Then, the network device transmits the downstream packet to a MAC layer switching device which is not configured with the pre-configured VLAN.

In some embodiments, the network device can perform a destination network address translation prior to transmitting the downstream packet to the MAC layer switching device.

In some embodiments, the network device further determines a first connection session based on the downstream packet, and retrieves a stored session link that associates the first connection session with the second connection session.

In some embodiments, the network device searches in a route cache for the MAC address corresponding to the second network device. Note that, the network device and the second network device are connected through the MAC layer switching device.

In some embodiments, the network device identifies an IP address that uniquely identifies the client based on a source IP address attribute corresponding to the second connection session. The packet may include the identified IP address and the MAC address resulting from searching the route cache.

In some embodiments, the network device provides a DHCP service for multiple clients connected to the network device and the second network device. Note that, the IP address uniquely identifying the client is within a non-overlapping IP sub-network address scope compared to an IP sub-network address scope to which the network device IP address belongs.

Architecture

FIG. 1 shows an exemplary wireless network environment according to embodiments of the present disclosure. The network illustrated in FIG. 1 includes at least switch 120, network DHCP server 110, a plurality of network devices (e.g., access point AP1 142, access point AP2 144, access point AP3 146, etc.), and a plurality of client devices (e.g., client 150, client 155, client 158, etc.).

DHCP server 110 provides network configuration services for hosts on the network. For example, client devices that are connected to the network need to be configured with an Internet Protocol (IP) address, as well as a default route and/or routing prefix before they can communicate with other hosts on the network. In addition to IP addresses, DHCP also provides other configuration information, such as, the IP addresses of local Domain Name Server (DNS), network boot servers, and/or other service hosts. Note that DHCP server 110 may be used for an Internet Protocol version 4 (IPv4) network as well as an Internet Protocol version 6 (IPv6) network. Client devices and/or network devices that do not use DHCP server 110 for IP address configuration may still use it to obtain other configuration information.

Switch 120 includes a plurality of ports, such as, port 1 121, port 2 123, port 3 125, port 4 127, and port 5 129. A switch typically refers to a multi-port network bridge that processes and routes data at the data link layer (layer 2) of the OSI model. However, a switch may operate at other layers of the OSI model. In addition, a switch can operate simultaneously at more than one of the OSI layers (also known as a "multilayer switch"). Switch 120 may, but is not limited to, perform the following management features: turning a particular port range on or off; allowing link bandwidth and duplex settings; allowing priority settings for ports; enabling IP clustering; preventing Media Access Control (MAC) flooding via MAC filtering; using Spanning Tree Protocol; monitoring device and link health under Simple Network Management Protocol (SNMP); port mirroring; link aggregation; providing VLAN settings; providing IEEE 802.1X standard-based network access control; Internet Group Management Protocol (IGMP) snooping; etc.

In particular, if VLANs are created and configured on switch 120, the VLANs can serve security and performance goals by reducing the size of broadcast domains. However, switch 120 may not be configured with any VLANs, in which scenario all network traffic will be transmitted on a native VLAN. In some embodiments, the native VLAN may be assigned a customary VLAN identifier; and packets to be transmitted on the native VLAN may be tagged with the customary VLAN identifier. In other embodiments, the native VLAN will use a default VLAN identifier; and packets to be transmitted on the native VLAN will not be tagged. Note that, conventionally, network traffic transmitted on native VLAN through switch 120 cannot be separated. Furthermore, when packets transmitted on the native VLAN through switch 120 does not specify a VLAN identifier, other VLANs configured on switch 120 may be susceptible to security attacks, which would allow traffic on the native VLAN to be mixed with traffic on other VLANs.

The plurality of network devices may provide wireless or wired network access to the plurality of clients. In some embodiments, the plurality of network devices includes one or more access points. In some embodiments, the access points are managed by network controller. The network controller may handle functionalities, such as, automatic adjustments to radio frequency power, channel management, authentication, security, etc. Furthermore, multiple network controllers can be combined to form a mobility group to allow inter-controller roaming. In some embodiments, the network controller may be a dedicated network device. In other embodiments, the network controller may be a software module loaded on a network device (e.g., an access point) and functioning as a virtual controller. In one embodiment, a plurality of access points in a network may elect one or more access points to act as a virtual controller and to perform controller functionalities, for example, as illustrated in FIG. 1, AP3 146 may be elected as the virtual controller for the plurality of access points including AP1 142, AP2 144, and AP3 146.

Note that the plurality of access points may be equipped with multiple-input multiple-output (MIMO) technology, which utilizes multiple radio antennas at both the transmitter and the receiver to improve communication performance of the access points. Moreover, the plurality of access points can support multiple radio frequency wireless communication bands. For illustration purposes only, assume that, in FIG. 1, AP3 146 is elected among the plurality of access points to be the virtual controller. A virtual controller is capable of performing functions typically performed by a network controller device, but resides on a low-cost access point instead of network controller device.

Furthermore, an access point may advertise multiple networks, each network being identified by a unique service set identifier (SSID). A service set typically refers to all the devices associated with a local or enterprise wireless local area network. In infrastructure mode, a single access point (AP) together with its associated stations (STAB) is called a basic service set (BSS). In ad hoc mode, a set of synchronized stations, one of which acts as master, forms a BSS. Each BSS is identified by a BSSID. The most basic BSS consists of one access point and one station. An extended service set (ESS) is a set of one or more interconnected BSSs and integrated local area networks that appear as a single BSS to the logical link control layer at any station associated with one of those BSSs. The set of interconnected BSSs should have a common service set identifier (SSID). They can work on the same channel, or work on different channels to increase aggregate throughput. The SSID can be used to uniquely identify a network.

In the example illustrated in FIG. 1, AP1 142, AP2 144, and AP3 146 can each advertise guest network 160, which is identified by its unique service set identifier (SSID) SSID_Guest, for use by corporate guests. Meanwhile, each of the AP1 142, AP2 144, and AP3 146 can also advertise corporate network 165, which is identified by its unique service set identifier (SSID) SSID_Corp, for use by corporate employees. Thus, client 150 on guest network 160 and client 155 on corporate network 165 may be associated with the same access point, e.g., AP1 142, at the same time.

Moreover, for illustration purposes only, assume that no VLAN is configured for either guest network 160 (SSID_Guest) or corporate network 165 (SSID_Corp) on switch 120. Thus, both traffic from guest network 160 (SSID_Guest) and from corporate network 165

(SSID_Corp) received by switch 120 will be transmitted on a native VLAN. Moreover, when the native VLAN identifier is unspecified, upon receiving a packet from client 150 on guest network 160, AP1 142 will further ensure that the VLAN identifier corresponding to the VLAN pre-configured on the APs for guest network 160 is not included in the packet prior to forwarding the packet to switch 120.

The plurality of client devices may associate with the network through wireless links and/or wired connections to network devices such as access points, switches, routers, hubs, bridges, etc. Also, the plurality of access points may connect with one or more network devices (e.g., switches, routers, etc.) through wired ports. In the example illustrated in FIG. 1, wireless client 150 is associated with AP1 142 on guest network 160; and, wireless client 155 is associated with AP1 142 on corporate network 165. Further, AP1 142 is connected to port 1 121 of switch 120; AP2 144 is connected to port 2 123 of switch 120; AP3 146 is connected to port 3 125 of switch 120; and, network DHCP server 110 is connected to port 4 127 of switch 120.

As mentioned above, VLANs may not be configured on network devices in the network. If so, all network traffic will be transmitted on the native VLAN. If, on the other hand, customary VLANs are configured on network devices (e.g., access points, switches, etc.), FIGS. 2A-2B show exemplary VLAN configurations in a wireless network environment according to embodiments of the present disclosure.

Figure 2A:
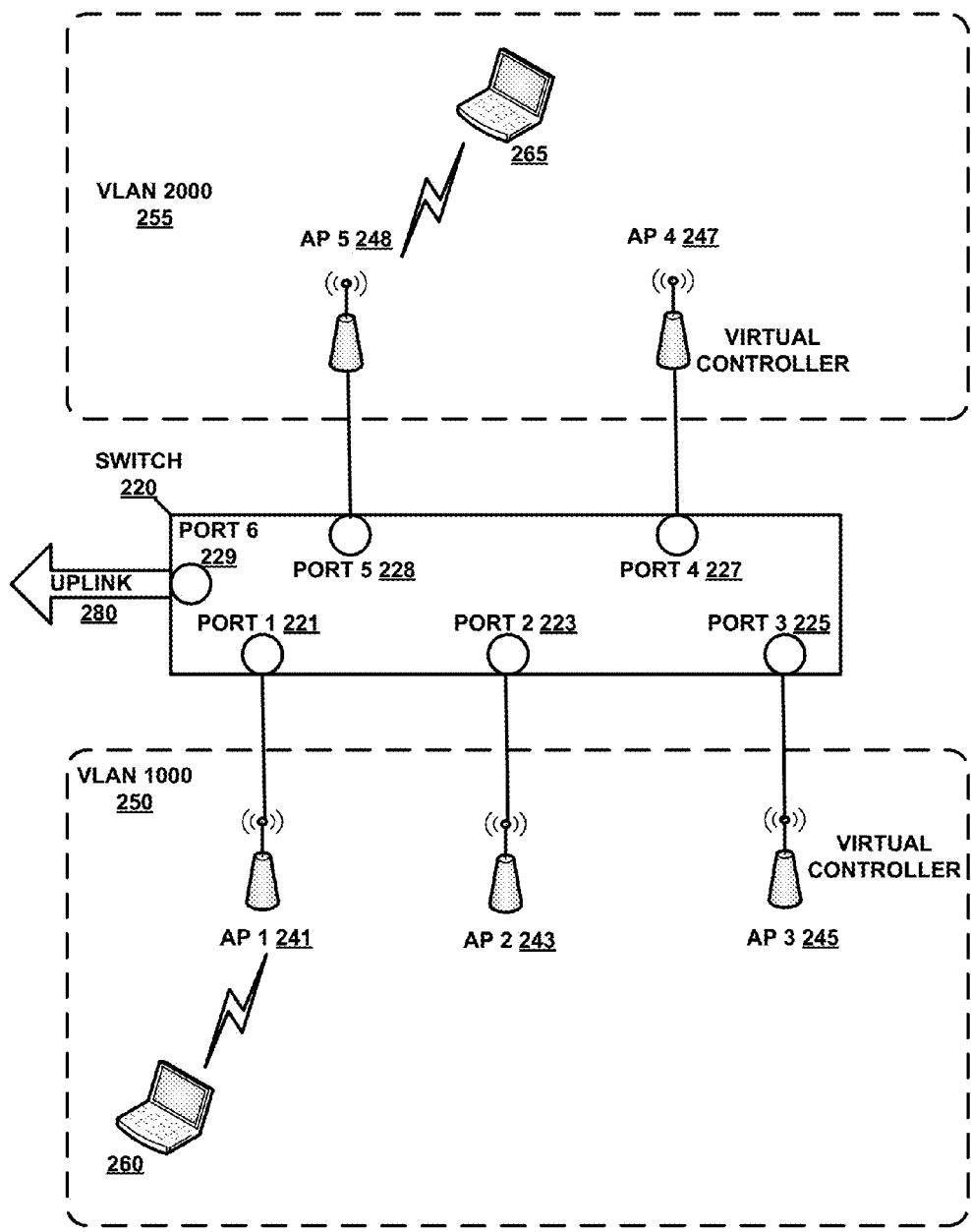
FIGS. 2A-2B show exemplary VLAN configurations in a wireless network environment according to embodiments of the present disclosure.
Figure 2B:
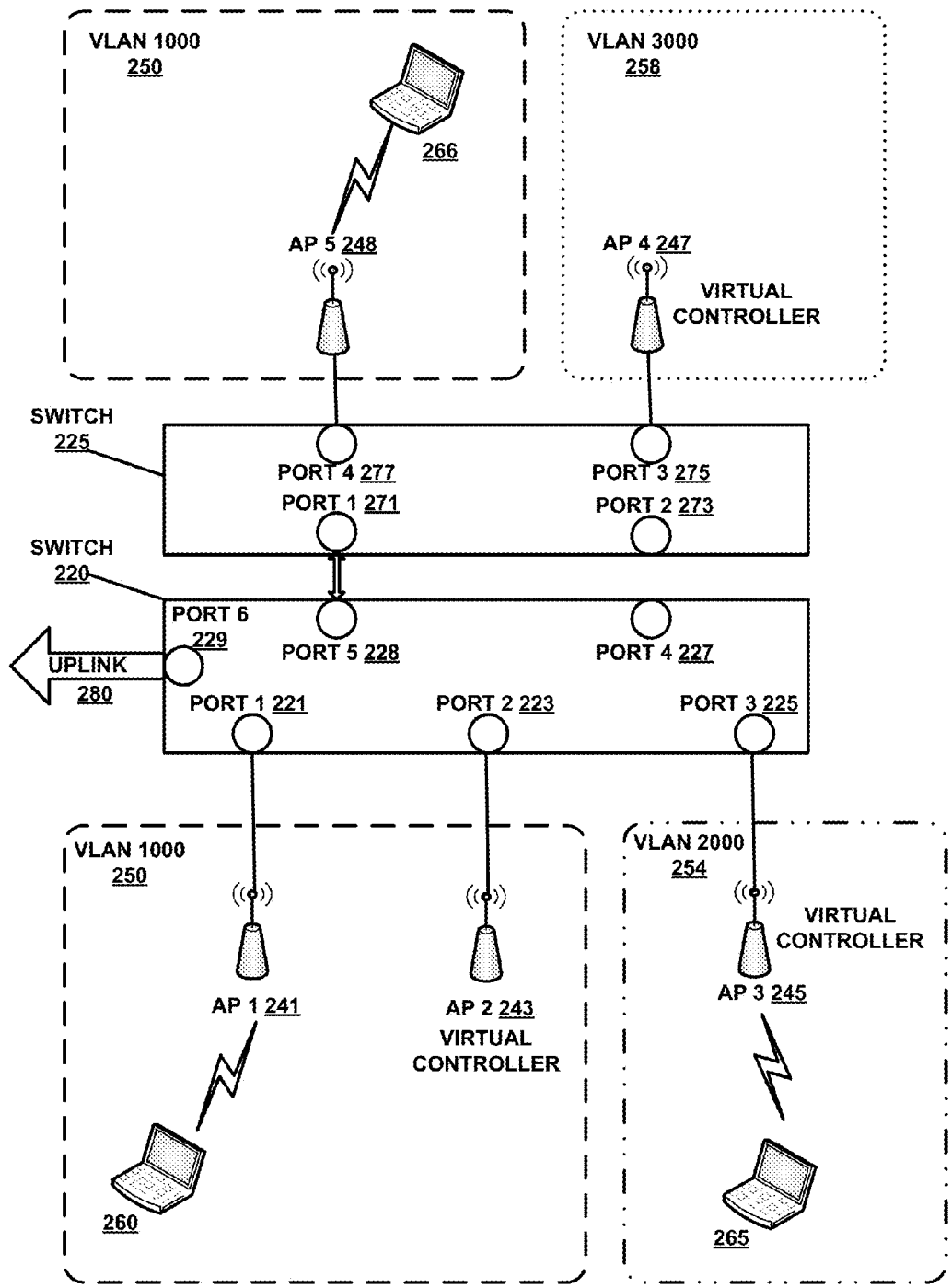

Specifically, the exemplary network illustrated in FIG. 2A includes one switch 220, and at least two VLANs, namely VLAN 1000 250 and VLAN 2000 255. In some embodiments, VLAN 1000 250 may be dedicated for traffic on a guest network, whereas VLAN 2000 255 may be dedicated for traffic on a corporate network.

Each VLAN may be configured on one or more access points. For example, VLAN 1000 250 is configured on access points AP1 241, AP2 243, and AP3 245; and, VLAN 2000 255 is configured on access points AP4 247 and AP5 248. Moreover, one or more clients are associated with the access points in each VLAN. For example, in VLAN 1000 250, client 260 is associated with AP1 241; in VLAN 2000 255, client 265 is associated with AP5 248.

In addition, each VLAN includes one network controller or virtual controller. A virtual controller can be an access point elected among the plurality of access points in a VLAN to perform controller functionalities. For example, AP3 245 may be elected as the virtual controller in VLAN 1000 250; and AP4 247 may be elected as the virtual controller in VLAN 2000 255.

The plurality of access points are connected via wired ports with switch 220. For example, AP1 241 is connected via port 1 221 to switch 220; AP2 243 is connected via port 2 223 to switch 220; AP3 245 is connected via port 3 225 to switch 220; AP4 247 is connected via port 4 247 to switch 220; and, AP5 248 is connected via port 5 228 to switch 220. Client devices and/or network devices on the same VLAN belong to the same broadcast domain, and are permitted to communicate with each other. However, client devices and/or network devices on different VLANs are not permitted to communicate with each other. To do so, a network administrator may configure port 1 221, port 2 223, and port 3 on 225 of switch 220 to associate with a VLAN for the guest network. Likewise, port 4 227 and port 5 228 of switch 220 may be configured to associate with another VLAN for the corporate network.

In some embodiments, the VLAN configurations on switch 220 may differ from the VLAN configurations on the plurality of access points, such as AP1 241 to AP5 248. For example, untagged traffic on the guest network may be tagged with a unique identifier associated with the native VLAN by switch 220, e.g., VLAN 1. In such scenario, APs in VLAN 1000 250 can further obtain the native VLAN identifier configured on switch 220, and map the VLAN identifier for the native VLAN configured on switch 220 to the VLAN identifier for a pre-configured VLAN (e.g., the VLAN dedicated for the guest network) on the access points. When an AP receive a packet from a client connected on the guest network, the AP will modify the VLAN identifier tag in the packet header to remove any VLAN identifier such that the packet will be untagged before being transmitted to switch 220. When switch 220 receives the untagged packet, switch 220 will tag the packet with a unique identifier associated with the native VLAN.

Furthermore, switch 220 may optionally include port 6 229, which supports uplink connection 280. Uplink connection 280 may be another wireless local area network, a wired local area network, a cellular network (e.g., 3G, 4G LTE, etc.), and so on.

Also, the same VLAN may be configured on multiple switches in the network. All access points and their associated stations within the same VLAN belong to the same broadcast domain and can communicate with each other, even though they are physically connected to different switches. For example, the network illustrated in FIG. 2B includes two switches—switch 220 and switch 225, and three VLANs, namely VLAN 1000 250, VLAN 2000 254, and VLAN 3000 258. Each VLAN is configured on one or more access points. For example, VLAN 1000 250 is configured on access points AP1 241, AP2 243, and AP5 248; VLAN 2000 254 is configured on access point AP3 245; and, VLAN 3000 258 is configured on access point AP4 247. Moreover, one or more clients are associated with the access points in each VLAN. For example, in VLAN 1000 250, client 260 is associated with AP1 241, and client 266 is associated with AP5 248; in VLAN 2000 254, client 265 is associated with AP3 245; etc.

In addition, each VLAN includes one network controller or virtual controller. A virtual controller can be an access point elected among the plurality of access points in a VLAN to perform controller functionalities. For example, AP2 243 may be elected as the virtual controller in VLAN 1000 250; AP3 245 may be elected as the virtual controller in VLAN 2000 254; AP4 247 may be elected as the virtual controller in VLAN 3000 258; etc. Each virtual controller is associated with a virtual controller IP (VCIP) address. In some embodiments, when one access point acting as the virtual controller fails, another access point in the plurality of access points within the same VLAN will be elected as the virtual controller and will be using the same VCIP address.

The plurality of access points are connected via wired ports with network devices in the network, such as, switch 220 and switch 225. For example, AP1 241 is connected via port 1 221 to switch 220; AP2 243 is connected via port 2 223 to switch 220; AP3 245 is connected via port 3 225 to switch 220; AP4 247 is connected via port 3 275 to switch 225; and, AP5 248 is connected via port 4 277 to switch 225. Client devices and/or network devices on the same VLAN belong to the same broadcast domain and are permitted to communicate with each other. On the other hand, client devices and/or network devices on different VLANs are not permitted to communicate with each other. To do so, a network administrator may configure port 1 221 and port 2 223 of switch 220, as well as port 4 277 of switch 225 to allow traffic on VLAN 1000 250. Likewise, the network administrator may configure port 3 225 of switch 220 to allow traffic on VLAN 2000 254, and port 3 275 of switch 225 to allow traffic on VLAN 3000 258. In addition, the network administrator may configure port 5 228 of switch 220 and port 1 271 of switch 220 to be trunk ports, each of which supports at least VLAN 1000 250 such that clients associated with APs connected to switch 220 can communicate with other clients associated with APs connected to switch 225 if they are within the same broadcast domain.

Furthermore, switch 220 or switch 225 may optionally include a port, such as port 6 229 of switch 220 as illustrated in FIG. 2B, that supports uplink connection 280. Uplink connection 280 may be another wireless local area network, a wired local area network, a cellular network (e.g., 3G, 4G LTE, etc.), and so on.

DHCP Packets on Pre-Configured VLAN

Figure 3A:
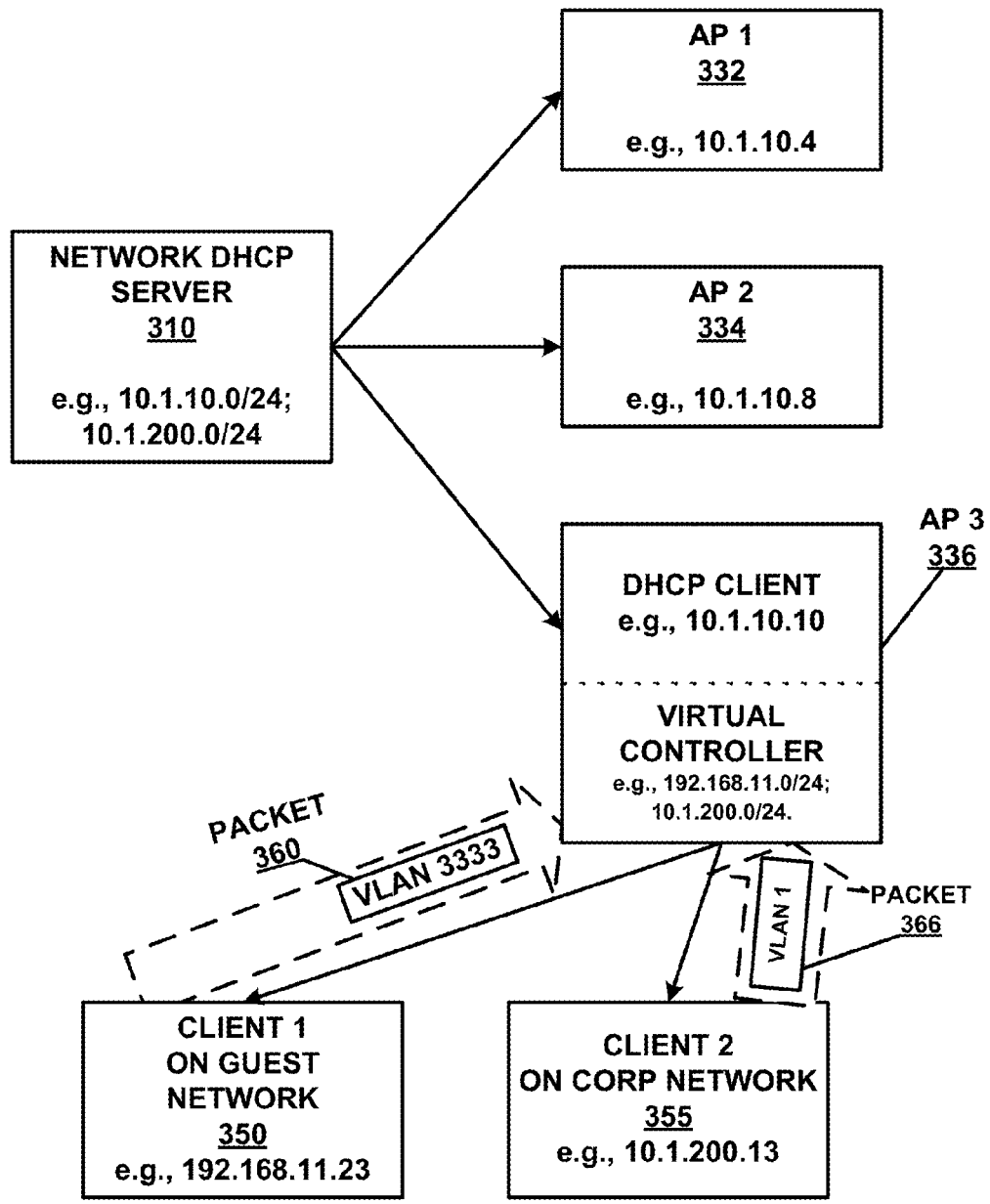
FIG. 3A is a block diagram illustrating exemplary Dynamic Host Configuration Protocol (DHCP) address scope sub-network configurations according to embodiments of the present disclosure.

FIG. 3A is a block diagram illustrating exemplary Dynamic Host Configuration Protocol (DHCP) address scope sub-network configurations according to embodiments of the present disclosure. The DHCP configurations illustrated in FIG. 3A includes network DHCP server 310, a plurality of access points (e.g., AP1 332, AP2 334, and AP3 336), and a plurality of clients (e.g., client 1 350 on guest network, client 2 355 on corporate network).

In some embodiments, at least one AP in the plurality of APs is elected as a virtual controller performing controller functionalities. The elected AP may also be referred to as a "master AP." A virtual controller is capable of performing functions typically performed by a network controller device, but resides on a low-cost access point instead of a network controller device. The virtual controller is associated with a virtual controller IP (VCIP) address. In some embodiments, when one access point acting as the virtual controller fails, another access point in the plurality of access points within the same VLAN will be elected as the virtual controller (or master AP) and will be using the same VCIP address.

Moreover, AP1 332, AP2 334, and AP3 336 each has an Internet Protocol (IP) address allocated by network DHCP server 310 when they first power up. In the example illustrated in FIG. 3A, network DHCP server 310 is configured with IP address scope "10.1.10.0/24" for the DHCP service it provides. In this example, for illustration purposes only, as a DHCP client of network DHCP server 310, AP1 332 is allocated with IP address "10.1.10.4;" AP2 334 is allocated with IP address "10.1.10.8;" and AP3 336 is allocated with IP address "10.1.10.10."

Furthermore, AP3 336 acting as the virtual controller starts a DHCP service locally, serving clients connected to the plurality of APs on the guest network. In order to generate the address scope of the DHCP service hosted on the virtual controller residing on AP3 336, e.g., for clients on the guest network, AP3 acting as the virtual controller will check its own IP address allocated by network DHCP server 310. In this example, AP3 336 retrieves its own IP address "10.1.10.10" and estimates the address scope of the DHCP address pool that AP3 336's own IP address falls in. Next, AP3 336 automatically generates a non-conflicting DHCP address scope to be configured as the DHCP address pool for the DHCP service hosted on the virtual controller AP3 336. For example, if the IP address allocated for AP3 336 is within the scope "192.168.X.Y," then AP3 336 acting as the virtual controller will configure the DHCP service to use the address scope "172.16.11.X" for the pre-configured VLAN on the APs which is not configured on the network switches; if, on the other hand, the IP address of AP3 336 is outside the scope of "192.168.X.Y," then AP3 acting as the virtual controller will configure the DHCP service to use the address scope "192.168.11.X" for the pre-configured VLAN on the APs which is not configured on the network switches.

In some embodiments, the DHCP service hosted on AP3 336 may serve multiple VLANs configured on the plurality of APs. For example, the DHCP service may allocate an address scope, such as "192.168.11.0/24," for one VLAN that is pre-configured on the APs but not the layer 2 switching devices in the network, and a different address scope, such as "10.1.200.0/24," for another VLAN for a different network such as a corporate network. In other embodiments, network DHCP server 310 (or a different network DHCP server) may be configured to provide DHCP service using the address scope, such as "10.1.200.0/24" for the other VLAN for the different network (e.g., the corporate network) and to serve as a DHCP gateway for clients connected to the APs on the other VLAN.

When an AP such as AP3 336 in the network receives packet 360, such as a connection request, from a client, e.g., client 1 350 on guest network SSID_Guest, AP3 336 will associate the requesting client 350 with a dedicated VLAN (e.g., VLAN 3333) for guest network traffic that is pre-configured on the plurality of APs. Moreover, AP3 336 acting as the virtual controller will assign an available IP address within its DHCP address scope to client 350.

Note that the VLAN pre-configured on the access points is not a real VLAN recognized by switches/routers in the network. Thus, in some embodiments, when an access point, such as AP3 336, receives packet 360 from client 350 on guest network SSID_Guest, and identifies that packet 360 is associated with the pre-configured VLAN (e.g., VLAN 3333), the access point removes VLAN identifier tag (if any) from packet 360. Then, the access point forwards packet 360 with an unspecified VLAN identifier tag. As such, because packets with VLAN tag as unspecified VLAN will be transmitted on the native VLAN, guest network traffic on the pre-configured VLAN (e.g., VLAN 3333) will be transmitted on the native VLAN by the switch. In other embodiments, if the native VLAN is configured with a unique VLAN identifier by other switching devices in the network, the access point modifies the VLAN identifier tag in packet 360 to match the native VLAN identifier configured on the other switching devices in the network.

In comparison, packet 366 received by AP3 336 from client 2 355 on corporate network SSID_Corp will either be associated with the native VLAN or another VLAN that is different from the pre-configured VLAN on the APs. In some embodiments, the native VLAN is associated with a unique VLAN identifier (e.g., VLAN 1); and thus, packet 366 will include VLAN 1 in its VLAN identifier tag. If the native VLAN on the APs is configured with VLAN identifier VLAN 1, the APs will check to ensure that the pre-configured VLAN (e.g., VLAN 3333) for guest network uses another VLAN identifier that is different from VLAN 1.

In other embodiments, the other VLAN for corporate network traffic is a VLAN configured on both the APs and other Media Access Control (MAC) layer switching network devices; and thus, VLAN 1 can be recognized by both the APs and the other MAC layer switching devices in the network. Unlike packet 360 received from client 1 350 on the guest network, AP3 336 will simply forward packet 366 received from client 2 355 on the corporate network to the other switching devices.

Figure 3B:
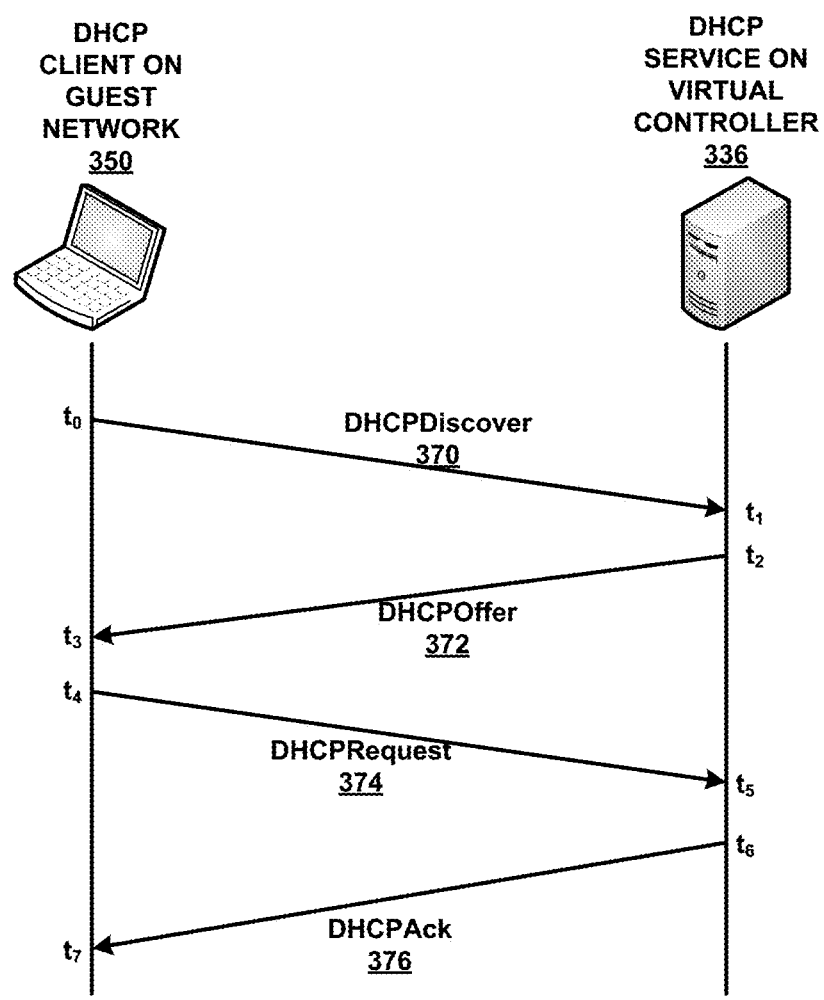
FIG. 3B is a sequence diagram illustrating exemplary communication exchanges during a DHCP lease process according to embodiments of the present disclosure.

FIG. 3B is a sequence diagram illustrating exemplary communication exchanges during a DHCP lease process according to embodiments of the present disclosure. A DHCP lease involves at least DHCP client 350 on the guest network and DHCP service on virtual controller at, for example, AP3 336. The DHCP lease process typically includes the following communication exchanges: At time point $t_0$, DHCP client 350 on the guest network sends a DHCPDiscover request 370 through a broadcast message. The DHCP service hosted on the virtual controller at AP3 336 receives the DHCPDiscover request 370 at time point $t_1$. Subsequently, at time point $t_2$, the DHCP service at AP3 336 responds with a DHCPOffer message 372, which may be sent through either a broadcast message or a unicast message. The DHCPOffer message 372 is received by DHCP client 350 at time point $t_3$. Next, DHCP client 350 retrieves the IP addresses from received DHCPOffer message 372, and sends a DHCPRequest 374 to the DHCP service on the virtual controller at AP3 336 through a unicast message at time point $t_4$. After receiving DHCPRequest 374 at time point $t_5$, the DHCP service on virtual controller at AP3 336 sends a DHCPAck message 376 to the client at time point $t_6$. The DHCPAck message 376 acknowledges the DHCP address allocation for client 350.

Figure 4A:
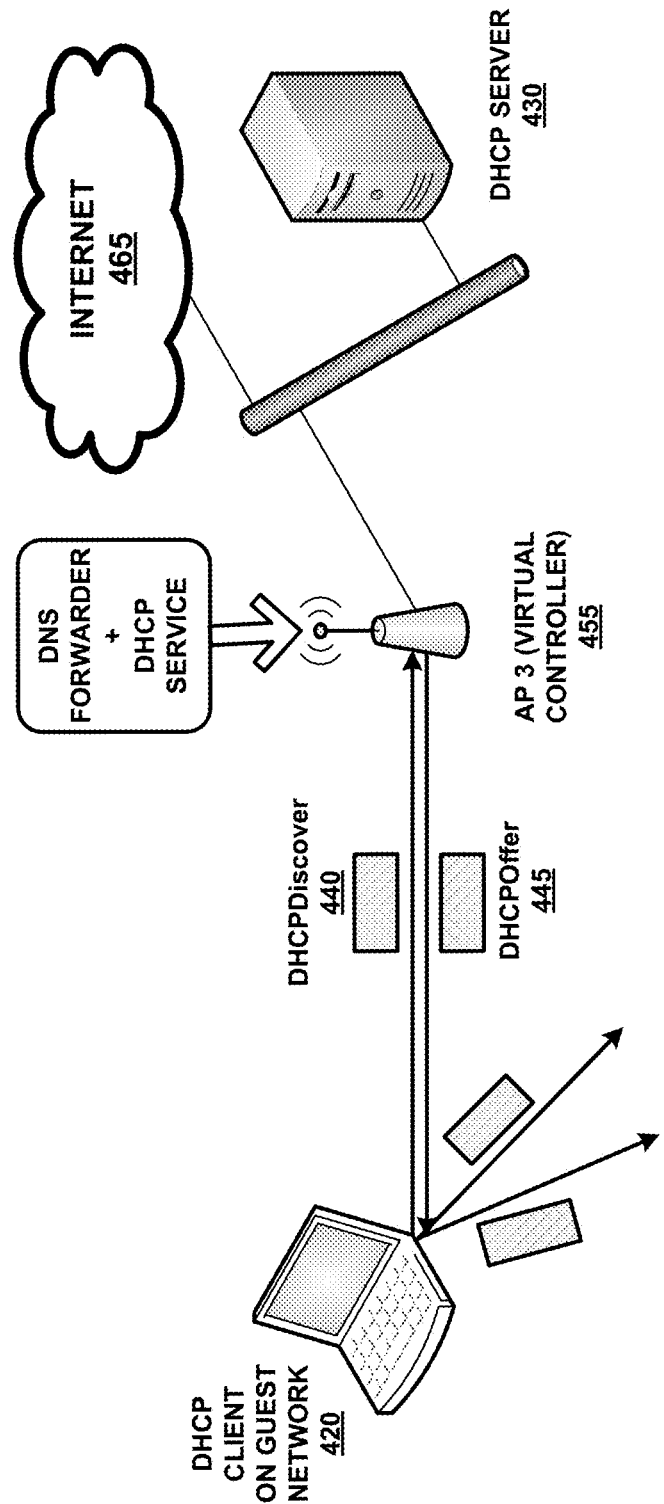
FIGS. 4A-4B are block diagrams illustrating exemplary DHCP communication exchanges on a pre-configured VLAN according to embodiments of the present disclosure.
Figure 4B:
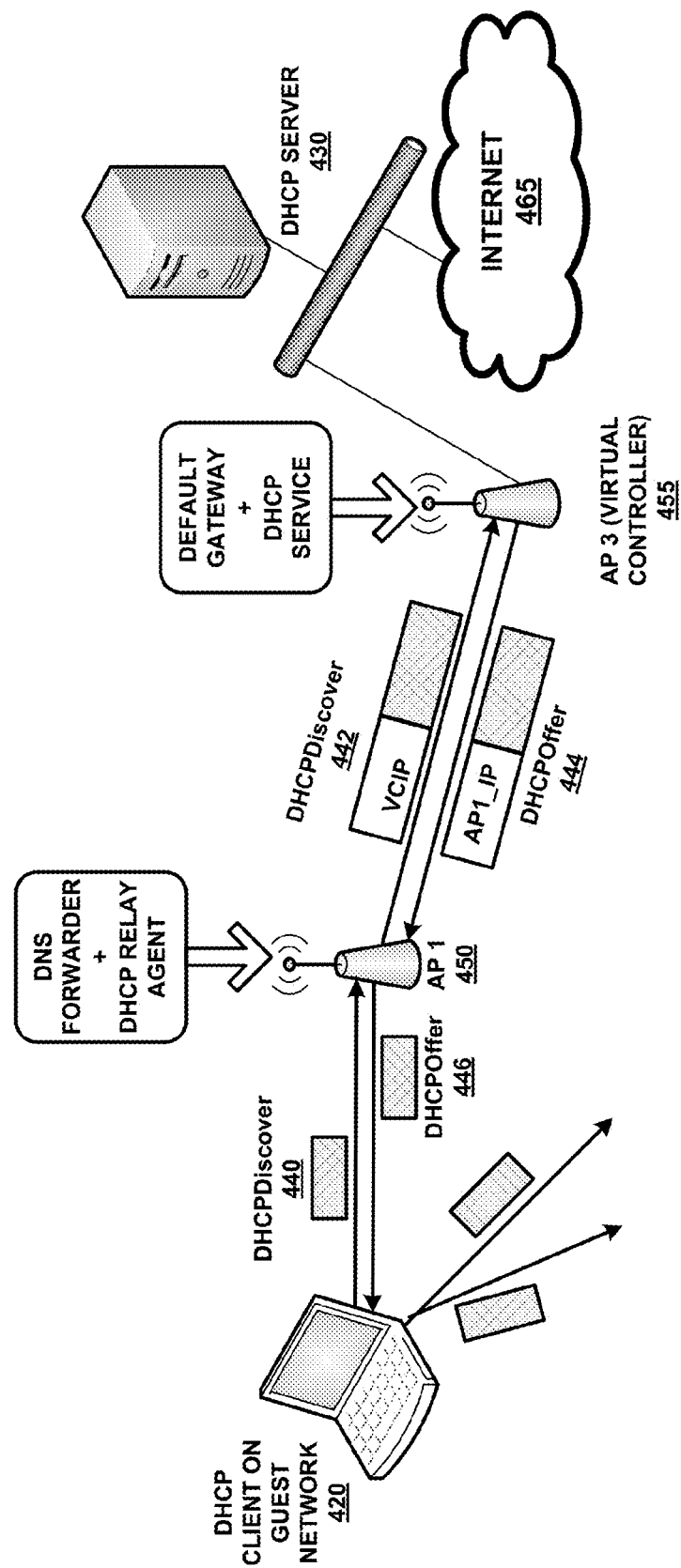
Figure 5:
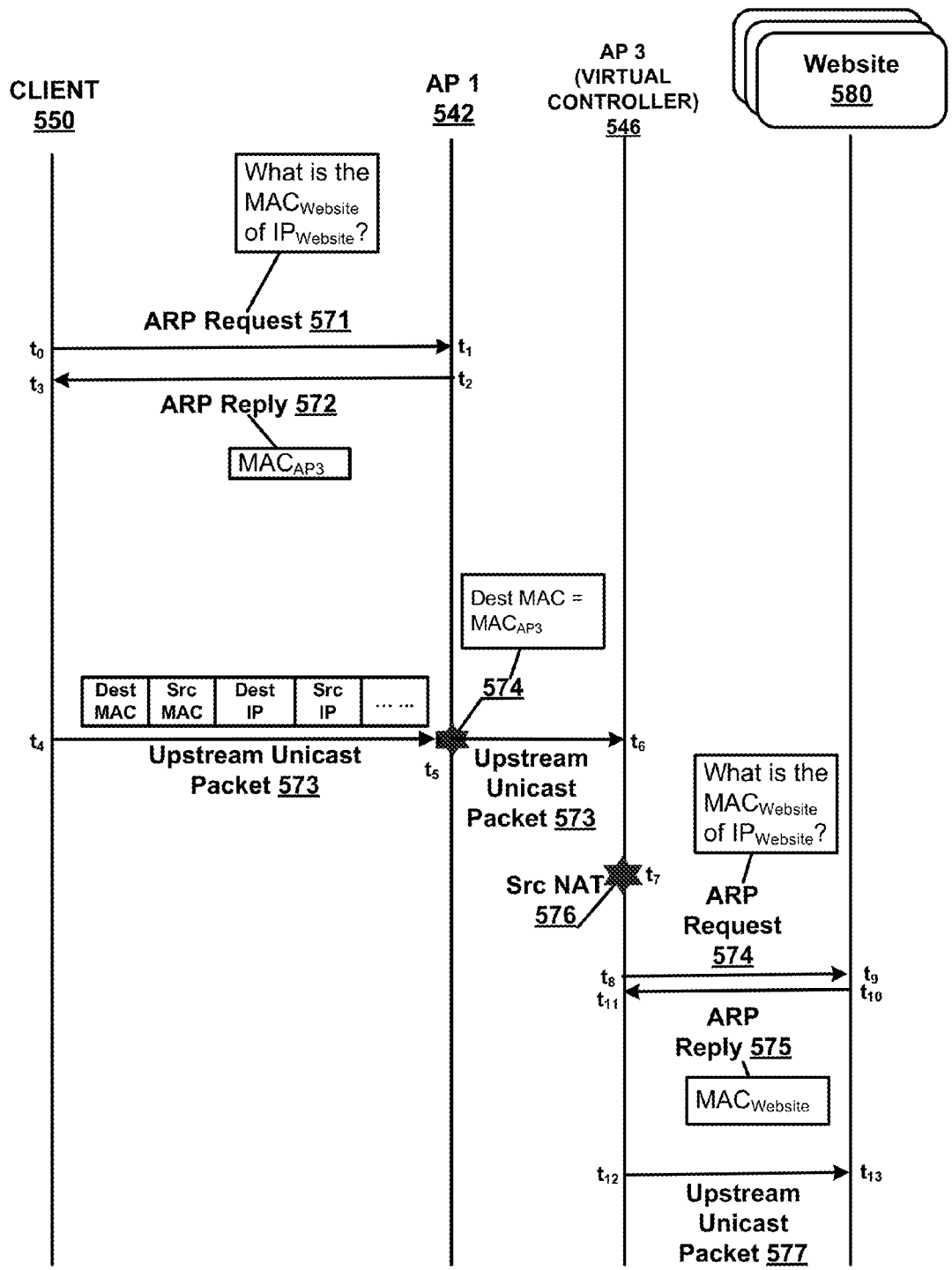
FIG. 5 is a sequence diagram illustrating exemplary Address Resolution Protocol (ARP) communication exchanges on a pre-configured VLAN during an upstream unicast packet delivery according to embodiments of the present disclosure.

FIGS. 4A-4B are block diagrams illustrating exemplary DHCP communication exchanges on a pre-configured VLAN according to embodiments of the present disclosure. FIG. 4A includes DHCP client 420 on the guest network SSID_Guest, AP3 455 which, for illustration purposes only, is elected as the virtual controller, and network DHCP server 430. AP3 455 may be connected to Internet 465 and network DHCP server 430 via one or more network switching devices (e.g., a switch, a router, a hub, a bridge, a network controller, and so on). As a virtual controller, AP3 455 runs one or more processes that function as, at the minimum, a Domain Name Service (DNS) forwarder and a DHCP service provider.

In the exemplary scenario illustrated in FIG. 4A, DHCP client 420 directly associates with AP3 455, which is the AP that is elected as the virtual controller. In other words, DHCP client 420 is associated with the AP that provides the DHCP service. Thus, when AP3 455 receives DHCPDiscover request 440 from DHCP client 420, the process functioning as the DHCP service provider on AP3 455 will respond to DHCP client 420 with DHCPOffer 445. Note that, the DHCP service hosted on AP3 is automatically configured with an IP address scope that is not in conflict with the IP address scope configured on network DHCP server 430. The virtual controller does so by retrieving AP3's own IP address which is allocated by network DHCP service 430, and by estimating the IP address scope configured on DHCP server 430 based on AP3 455's own IP address.

FIG. 4B includes DHCP client 420 on the guest network SSID_Guest, access point AP1 450 which DHCP client 420 is associated with on a wireless guest network, access point AP3 455 which, for illustration purposes only, is elected as the virtual controller serving a plurality of access points including AP1 450, and network DHCP server 430. AP3 455 may be connected to Internet 465 and network DHCP server 430 via one or more network switching devices (e.g., a switch, a router, a hub, a bridge, a network controller, and so on). As a virtual controller, AP3 455 runs one or more processes that function as, at the minimum, a default gateway and a DHCP service provider. A default gateway is associated with a default IP address to which packets received on a respective sub-network will be forwarded. For example, assuming that VCIP address is "192.168.11.1" (a private IP address associated with AP3 455), then the default gateway for guest network will be "192.168.11.1."

On the other hand, as one of the plurality of access points managed by the virtual controller, AP1 450 (as well as APs other than AP3 455) runs one or more processes that function as, at the minimum, a DHCP relay agent, and optionally, a DNS forwarder. A DNS forwarder is typically used to forward DNS queries for external DNS names to DNS servers located in external networks, e.g. networks outside the guest network and/or corporate network. When a DNS server is designated as the DNS forwarder, other DNS servers in the network forward the DNS queries, which they cannot resolve locally, to the designated DNS server. The use of DNS forwarder improves the efficiency, security, and privacy of DNS name resolution. Without having a specific DNS server designated as a forwarder, a lot of internal and possibly critical DNS information can be exposed on the external network. Absence of DNS forwarder may result in a large volume of external traffic that can be costly and inefficient for an enterprise network. The DNS forwarder can create a cache of external DNS information, because many external DNS queries in the network are resolved through the DNS forwarder. Thus, the DNS forwarder can resolve a good portion of external DNS queries using its cached data.

Note that, in the exemplary scenario illustrated in FIG. 4B, DHCP client 420 associates with AP1 450 (also referred to as a "slave AP"), which is not the AP that is elected as the virtual controller (e.g., AP3 455, also referred to as a "master AP"). In other words, DHCP client 420 is associated with the AP that provides the DHCP relay service rather than the DHCP service. With the DHCP relay service configured on AP1 450, all DHCPDiscover messages will be forwarded to the DHCP server hosted on AP3 455. Unlike the DHCP service, the DHCP relay service cannot directly respond to a client's DHCPDiscover message with a DHCPOffer message.

Thus, when AP3 455 receives a DHCPDiscover request from DHCP client 420 on a pre-configured VLAN (e.g., VLAN 3333, or VLAN 1000, etc.), some special handlings will be performed. Such pre-configured VLAN can be, for example, the VLAN pre-configured on the access point for traffic on guest network SSID_Guest. Specifically, the access point (e.g., AP1 450) will insert a header in data packet, which includes DHCPDiscover request 440. The header includes at least an IP address associated with the virtual controller (e.g., VCIP). As previously mentioned, the virtual controller is associated with a fixed virtual controller IP address (VCIP). When one access point (e.g., AP3 455) acting as the virtual controller fails, another access point (e.g., AP2 which is not shown in FIG. 4B) in the plurality of access points within the same VLAN will be elected as the virtual controller and will be associated with the same VCIP address. Therefore, DHCPDiscovery request 440 from client 420, which was a multicast or broadcast message, is effectively changed into a unicast message (i.e., DHCPDiscover message 442) to the virtual controller hosted on AP3 455.

The DHCP service hosted on AP3 455 is automatically configured with an IP address scope that is not in conflict with the IP address scope configured on network DHCP server 430. Specifically, the virtual controller retrieves AP3 455's own IP address, which is allocated by network DHCP server 430, and estimates the IP address scope configured on DHCP server 430 based on AP3 455's own IP address. In one embodiment, the DHCP service hosted on AP3 455 is pre-configured with a fixed IP address scope, e.g., "192.168.11.X." Furthermore, the DHCP service checks whether AP3 455's own IP address is within the range of the pre-configured IP address scope. If so, the DHCP service automatically re-allocates a different IP address scope, for example, "172.168.11.X," for the DHCP service hosted on AP3 455. When AP3 455 receives DHCPDiscover request 442 from AP1 450, the DHCP service process on AP3 455 will respond to a DHCP relay agent on AP1 450 with DHCPOffer message 444. In one embodiment, DHCPOffer message 444 can be a unicast message with AP1 450's IP address as its destination address. When AP1 450 receives the DHCPOffer message 444, the DHCP relay agent on AP1 450 forwards DHCPOffer message 446 to client 420.

ARP Packets on Pre-Configured VLANs

TCP/IP Address Resolution Protocol (ARP) facilitates dynamic address resolution between IP and Ethernet. It is a request and reply protocol that runs encapsulated by the line protocol. The ARP messages are communicated within the boundaries of a single network, and are never routed across internetwork nodes. ARP works by allowing an IP device to send a broadcast message on the local network, requesting that another device on the same local network respond with its hardware address. ARP typically uses a cache, where it keeps bindings between IP addresses and data link layer addresses (e.g., MAC addresses) on the local network. Moreover, various techniques have been developed for maintaining cache entries, as well as supporting cross-resolution by pairs of devices and/or proxy ARP. With proxy ARP, a network device on a network responds the ARP request messages for a network address that is not on that network. The ARP Proxy is aware of the location of a network packet's destination, and offers its own MAC address in the ARP response message when serving as a proxy for another host. Thus, the network packet will be transmitted to the proxy on a layer 2 network based on the destination's MAC address, which is the ARP proxy's MAC address. The captured network packet is then typically routed by the ARP proxy to its intended destination via another interface or via a tunnel.

As an example, suppose that client 550 wants to send a network packet to website 580. Because client 550 does not have website 580's hardware address in its cache, client 550 transmits an ARP request 571 via broadcast or multicast on the guest network to inquire the MAC address of the web server hosting website 580. However, client 550 will soon find out that the web server hosting website 580 is not on client 550's local network. The router(s) between client 550 and web server 580 will not pass client 550's broadcast ARP request onto the network which the web server 580 is a part of, because routers don't pass hardware-layer broadcasts.

According to embodiments of the present disclosure, when any ARP request received from clients on the guest network SSID_Guest, the receiving access point will act as an ARP proxy, and reply to the ARP request with the virtual controller's MAC (VC MAC) address. Here, ARP request 571 may supply an IP address of the web server hosting website 580 at time point $t_0$. AP1 542 receives ARP request 571 at time point $t_1$, and responds with a corresponding ARP reply message 572 at time point $t_2$. In this example, ARP reply message 572 includes the Media Access Control (MAC) address of AP3 546, which is the access point elected to be the virtual controller, because the virtual controller (or the master AP) acts as the default gateway for all clients on the guest network. Thus, in this example, AP1 542, which is a slave AP receiving ARP requests from clients, acts as an ARP proxy and responds to any ARP requests received on a certain network or sub-network, e.g., the guest network, with the MAC address of AP3 546, which is the master AP in the network.

Hence, subsequent upstream unicast packets destined to website 580 will have AP3 546's MAC address as the destination MAC address. For example, at time point $t_4$, client 550 may transmit an upstream unicast packet 573 destined to website 580. In unicast packet 573, values in the source IP address and the MAC address fields correspond to the IP address and the MAC address of client 550 respectively; value of the destination IP address corresponds to website 580's host IP address; value of the destination MAC address corresponds to the MAC address received in ARP reply 572, which is AP3 546's MAC address in this example. Because AP1 542 and AP3 546 are typically interconnected via one or more switching devices which forward network packets based on their MAC addresses and not their IP addresses, when AP1 542 and its connected switching device(s) subsequently receives upstream unicast packet 573 at time point $t_5$, they will identify the destination MAC address from upstream unicast packet, and forward upstream unicast packet 573 based on the identified destination MAC address (operation 574).

When AP3 546 receives upstream unicast packet 573 at time point $t_6$, AP3 546 may broadcast an ARP request 574 to an external network to inquire the MAC address corresponding to the web server hosting website 580. In some embodiments, AP1 542 and/or AP3 546 may maintain a cache for MAC addresses in previously received ARP replies, and search the cache for the destination MAC address corresponding to the destination IP in the unicast packet.

Moreover, at time point $t_7$, the virtual controller hosted on AP3 546 may perform a source network address translation (NAT). NAT is a functionality of a network device, such as a router, an access point, and so on. NAT allows the network device to replace the source and/or destination IP addresses of an IP packet when the IP packet passes through the network device. Here, the source NAT changes the source IP address from one network (e.g. an internal address to the guest network) to another network (e.g. an external address recognized by an external network) (operation 576). Specifically, in this example, AP3 546 may change the source IP address (e.g., 192.168.11.23) from client 550's IP address to AP3 546's public IP address (e.g., 10.1.10.10). Note that AP3 546's public IP address can be different from the VCIP address (e.g., 192.168.11.1), which will be associated with another AP in the plurality of APs in the event that AP3 546 fails and the other AP is elected as the new virtual controller.

Further, assuming that AP3 546 broadcasts ARP request 574 to the external network at time point $t_8$. The web server hosting website 580 (or a gateway network device having the MAC address of the web server cached) receives ARP request 574 at time point $t_9$, and responds with ARP reply 575 at time point $t_{10}$. At time point $t_{11}$, AP3 546 receives the MAC address corresponding to the web server hosting website 580. Note that the source NAT process can be independent from, and thus may be executed prior to, in parallel, or subsequent to the ARP request/reply process.

Subsequent to source NAT and receiving ARP reply, AP3 546 will transmit upstream unicast packet 577 at time point $t_{12}$. In upstream unicast packet 577, the source IP address corresponds to AP3 546's IP address as a result of the source NAT; the source MAC address corresponds to the MAC address of AP3 546; the destination IP address remains to be the same as that of received upstream unicast 573, which is the host IP address of website 580; and the destination MAC address corresponds to the MAC address received in ARP reply 575, which is the MAC address of the web server hosting website 580. In this example, upstream unicast packet 577 will be received by web server hosting website 580 at time point $t_{13}$.

Note that, in some embodiments, all other multicast/broadcast messages besides DHCP messages and ARP messages received by an access point from a client on a pre-configured VLAN will be dropped by the receiving access point. That is, the access point will not forward the multicast and/or broadcast messages transmitted on the pre-configured VLAN unless it is either a DHCP message or an ARP message.

Upstream Unicast Packets on Pre-Configured VLAN

Figure 6:
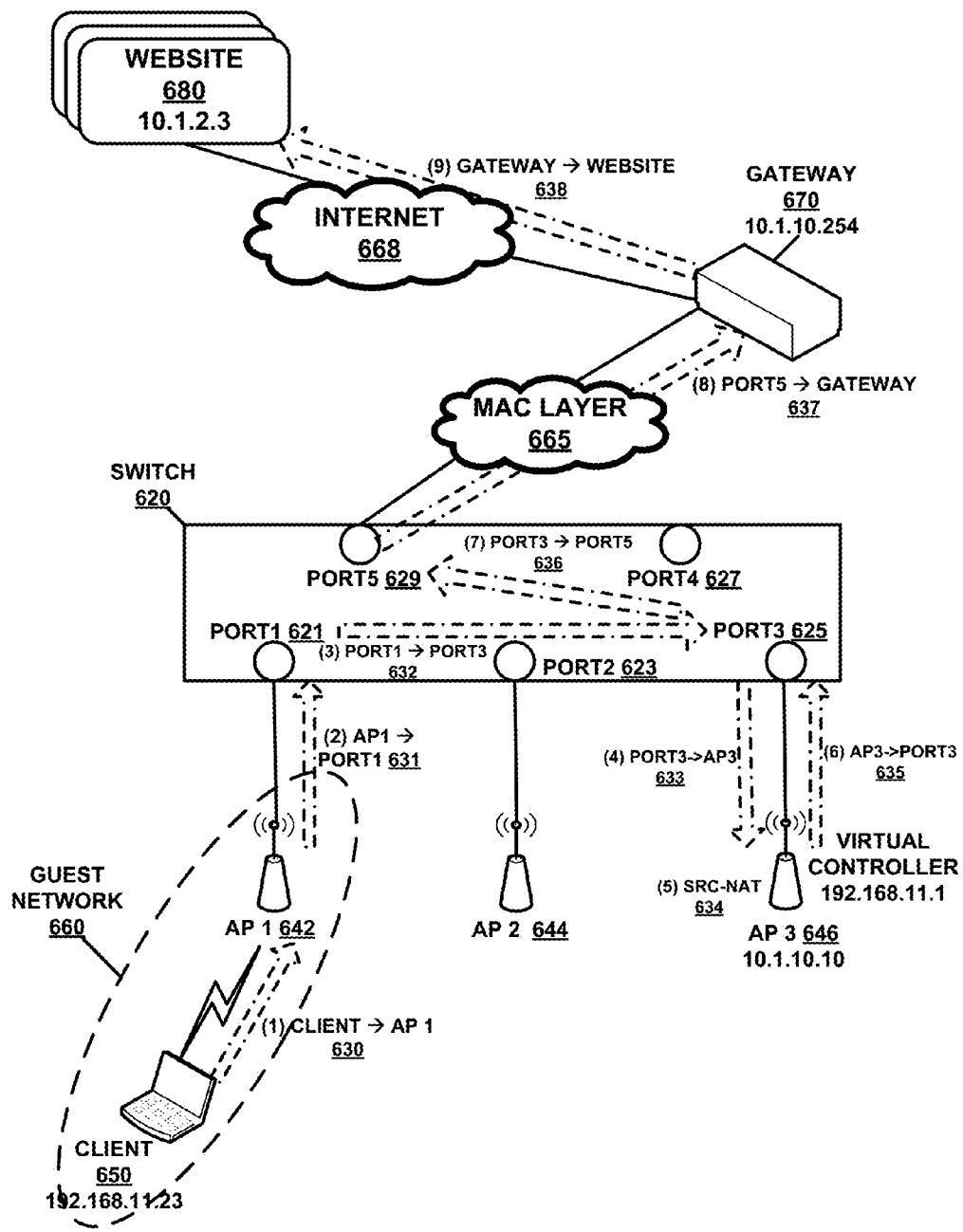
FIG. 6 is a block diagram illustrating exemplary upstream unicast packet delivery communication exchanges according to embodiments of the present disclosure.

FIG. 6 is a block diagram illustrating exemplary upstream unicast packet delivery communication exchanges according to embodiments of the present disclosure. FIG. 6 includes switch 620, a plurality of access points (e.g., AP1 642, AP2 644, AP3 646, etc.), and a plurality of clients including client 650. In addition, FIG. 6 includes gateway 670 that is interconnected via MAC layer network 665 with switch 620. Also, FIG. 6 includes website host 680 that is interconnected with gateway 670 via Internet 668.

Switch 620 includes a plurality of ports, such as, port 1 621, port 2 623, port 3 625, port 4 627, and port 5 629. A switch typically refers to a multi-port network bridge that processes and routes data at the data link layer (layer 2 of the OSI model). However, a switch may operate at other layers of the OSI model as well. In addition, a switch can operate simultaneously at more than one of the OSI layers (also known as a "multilayer switch"). Switch 620 may, but is not limited to, perform the following management features: turning a particular port range on or off; allowing link bandwidth and duplex settings; allowing priority settings for ports; enabling IP clustering; preventing Media Access Control (MAC) flooding via MAC filtering; using Spanning Tree Protocol; monitoring device and link health under Simple Network Management Protocol (SNMP); port mirroring; link aggregation; providing VLAN settings; providing IEEE 802.1X standard-based network access control; Internet Group Management Protocol (IGMP) snooping; etc.

Moreover, AP1 642, AP2 644, and/or AP3 646 can advertise guest network 660, which is identified by its unique service set identifier (SSID) SSID_Guest, for use by corporate guests. Meanwhile, each of the AP1 642, AP2 644, and AP3 646 may also advertise a corporate network (not shown), which is identified by its unique service set identifier (SSID) SSID_Corp, for use by corporate employees. Thus, client 650 on guest network 660 may be associated with the same access point, e.g., AP1 642, at the same time with another client on a different network.

In this example, assuming, for illustration purpose only, that AP1 642 is connected to port 1 621 of switch 620; AP2 644 is connected to port 2 623 of switch 620; AP3 646 is connected to port 3 625; and, gateway 670 is interconnected via MAC layer network 665 to port 5 629 of switch 620.

Furthermore, assuming, for illustration purpose only, that a DHCP service is hosted by the virtual controller on AP3 646. The DHCP service can automatically be configured with IP address scope "198.168.11.0/24," which is a non-conflicting scope of the DHCP address pool configured on another network DHCP server that assigns the IP address for AP3 646. Also, assuming that client 650 on guest network 660, which for example is identified by SSID_Guest, attempts to access website 680, which is hosted by a web server with IP address 10.1.2.3.

The upstream unicast packet transmission involves at least the following:

(1) An access point, e.g., AP1 642, receives an upstream unicast packet originated from client 650 (operation 630). Client 650 is associated with AP1 642 on guest network (SSID_Guest) 660. The unicast packet includes at least the following fields:

Source IP address;
Destination IP address;
Source MAC address; and
Destination MAC address.

In this example, for illustration purposes only, the source IP address will have the value "192.168.11.23," which is the IP address that the DHCP service hosted by the virtual controller on AP3 646 assigns to client 650 on guest network (SSID_Guest) 660 when client 650 first connected to guest network 660. Also, the destination IP address will have the value "10.1.2.3," which is the IP address of the web server hosting website 680 that client 650 on guest network 660 attempts to access. The source MAC address is the MAC address of client device 650. The destination MAC address is the MAC address in a previously received ARP reply. As previously described, when client 650 sends an ARP request with the web server's IP address to get the corresponding MAC address for the web server, the access point that client 650 is associated with (that is, AP1 642) will act as an ARP proxy and reply with the MAC address corresponding to the virtual controller on AP3 646. Client 650, however, may not be aware of the existence of the ARP proxy. Therefore, client 650 will use the MAC address in the received ARP rely as the destination MAC address for the destination MAC address in the upstream unicast packet, even though the destination corresponds to the web server rather than AP3 646 in this example.

(2) Access point AP1 642 receives a unicast packet from client 650 on guest network 660, and forwards the upstream unicast packet to switch 620 (operation 631). The upstream unicast packet is received at port 1 621, i.e., the port which AP1 642 is connected.

(3) Because the destination MAC address matches the virtual controller's MAC address (e.g., 192.168.11.1), switch 620, which only uses the MAC address of an incoming packet to forward the packet, will switch to transmit the received upstream unicast packet on port 3 625 (operation 632).

(4) Next, the upstream unicast packet will be transmitted from port 3 625 of switch 620 to the virtual controller on AP3 646 (operation 633).

(5) When access point AP3 646 acting as the virtual controller receives the upstream unicast packet from port 5 625 of switch 620, the virtual controller on AP3 646 performs a source NAT (operation 634), which replaces the value in the source IP address field of the upstream unicast packet from 192.168.11.23 (the client's IP address assigned by the DHCP service hosted on the virtual controller) to 10.1.10.10 (AP3 646's public IP address). Moreover, as previously mentioned, AP3 646 acting as the virtual controller can send an ARP request to network gateway 670 in order to determine the destination MAC address corresponding to the upstream unicast packet. The ARP request will include the IP address of the destination web server. Network gateway 670 will respond with the MAC address corresponding to the web server in an ARP reply. Upon receiving the ARP reply from network gateway 670, AP3 646 will change the value in the destination MAC address field of the unicast packet from the virtual controller's MAC address to the MAC address in the ARP reply received by AP3 646 (i.e. virtual controller) from network gateway 670 through switch 220 and MAC layer network 665.

(6) Next, after changing the values of the destination MAC address field and the source IP address field, AP3 646 acting as the virtual controller will send the upstream unicast packet to port 3 625 of switch 620 (operation 635). The upstream unicast packet includes the destination IP address and the destination MAC address corresponding to website

680's host server, and also includes the source IP address and the source MAC address corresponding to AP3 646. Therefore, any downstream response packet to the upstream unicast packet will be returned correctly to AP3 646.

(7) After switch 620 receives the upstream unicast packet from AP3 646 via port 3 625, switch 620 switches the received packet to be transmitted on port 5 629 (operation 636), because port 5 629 in the illustrated example is configured as a trunk port through which packets from the plurality of APs are forwarded to MAC layer network 665.

(8) The upstream unicast packet will be forwarded by one or more MAC layer devices, such as switches, hubs, etc., to gateway 670, which is configured for the network that AP3 belongs to (operation 637).

(9) Gateway 670 will then forward the upstream unicast packet to website 680's host server through Internet 668 (operation 638).

Downstream Unicast Packets on Pre-Configured VLAN

Figure 7A:
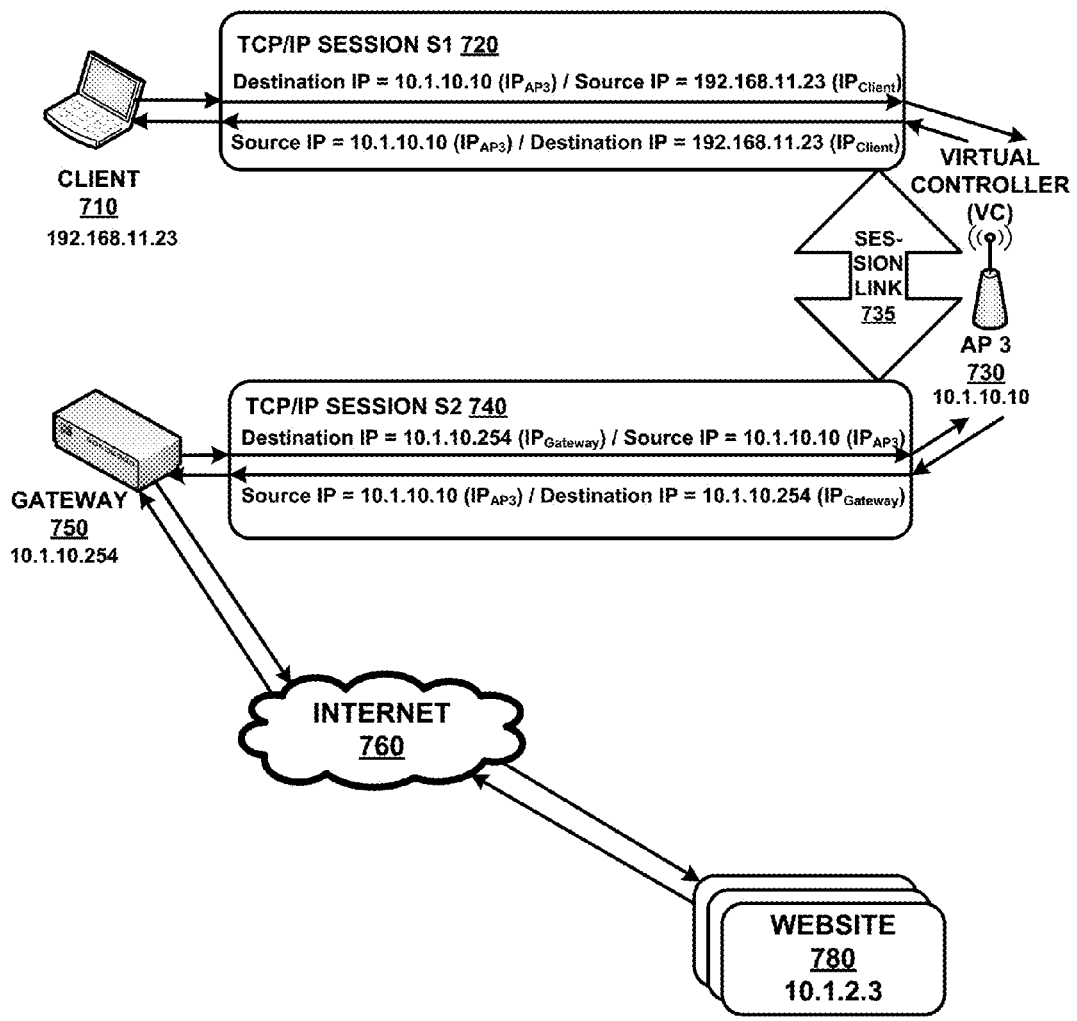
FIG. 7A is a block diagram illustrating exemplary TCP/IP session links according to embodiments of the present disclosure.
Figures 7B, 7C:
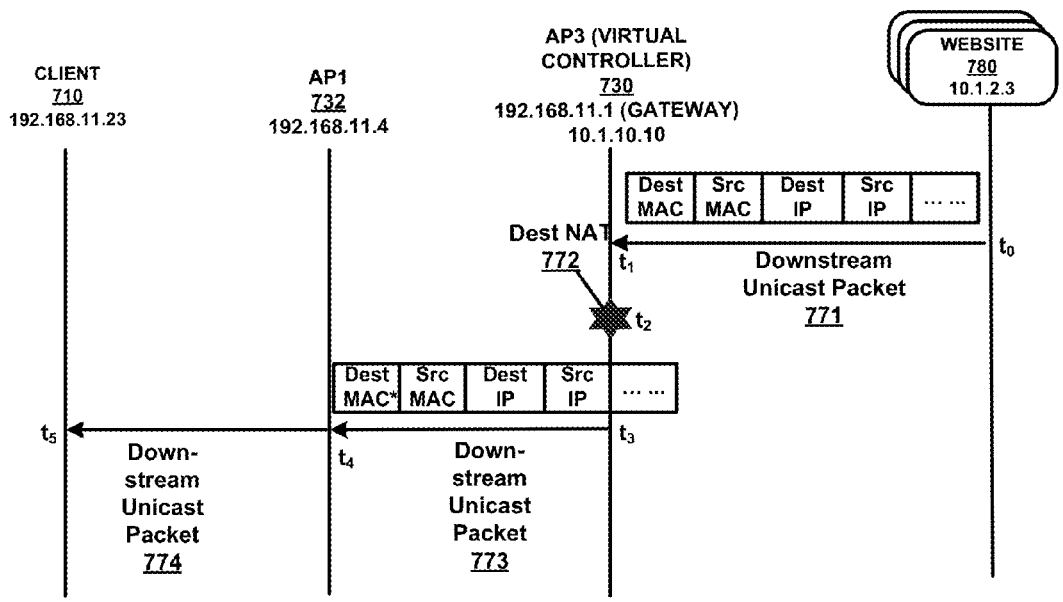
FIG. 7B is a sequence diagram illustrating exemplary downstream unicast packet delivery according to embodiments of the present disclosure.
FIG. 7C is a table illustrating values of address fields in a downstream unicast packet during the packet delivery according to embodiments of the present disclosure.

FIGS. 7A-7C describe downstream unicast packet destined to clients on the pre-configured VLAN on the APs. Specifically, FIG. 7A is a block diagram illustrating exemplary TCP/IP session links according to embodiments of the present disclosure. As previously mentioned in reference to FIG. 6, the upstream unicast packet has the AP3's IP address as the source IP address. As such, the response to the upstream unicast packet will be transmitted in a downstream unicast packet, which has the AP3's IP address as the destination IP address. In order to deliver the downstream unicast packet, a session link is established in the upstream unicast packet transmission process.

In particular, FIG. 7A includes client 710, AP3 730, gateway 750, and website 780 hosted on a web server, which is connected to gateway 750 via Internet 760. For transmission of unicast packet between client 710 and the web server hosting website 780, two TCP/IP sessions are created. The first TCP/IP session S1 720 is established between client 710 and the virtual controller on AP3 (i.e., the master AP) 730, whereas the second TCP/IP session S2 740 is established between the virtual controller on AP3 and gateway 750.

In this example, assuming for illustration purposes only that client 710 is assigned an IP address of "192.168.11.23" by the DHCP service hosted by the virtual controller on AP3 730; and, AP3 730 is assigned an IP address of "10.1.10.10" by a network DHCP server. Moreover, gateway 750 is configured for network traffic from AP3 730 (as well as other network devices on the same network) destined to an address in an external network. Here, assuming that gateway 750 is assigned an IP address of "10.1.10.254," and that website 780's host server is assigned an IP address of "10.1.2.3."

Usually, each TCP/IP session connection is uniquely identified by a 5-tuple parameter, e.g., {destination IP address, source IP address, IP protocol, destination port, source port}. For the upstream packets transmitted through TCP/IP session S1 720 from client 710 to the web server hosting website 780, the destination IP address in the 5-tuple parameter will be the IP address of AP3 730 (e.g., 10.1.10.10); and, the source IP address in the 5-tuple parameter will be the IP address of client 710 (e.g., 192.168.11.23). For downstream packets transmitted through TCP/IP session S1 720 from the web server hosting website 780 to client 710, the destination IP address in the 5-tuple parameter will be the IP address of client 710 (e.g., 192.168.11.23); and, the source IP address in the 5-tuple parameter will be the IP address of AP3 730 (e.g., 10.1.10.10).

Further, for the upstream packets transmitted through TCP/IP session S2 740 from client 710 to the web server hosting website 780, the destination IP address in the 5-tuple parameter will be the IP address of gateway 750 (e.g., 10.1.10.254); and, the source IP address in the 5-tuple parameter will be the IP address of AP3 730 (e.g., 10.1.10.10). For downstream unicast packets transmitted through TCP/IP session S2 740 from the web server hosting website 780 to client 710, the destination IP address in the 5-tuple parameter will be the IP address of AP3 730 (e.g., 10.1.10.10); and, the source IP address in the 5-tuple parameter will be the IP address of gateway 750 (e.g., 10.1.10.254).

In some embodiments, session link 735 is created at the time when a TCP/IP session from client 710 to website 780's host server is established. For example, during the upstream unicast packet transmission process, the virtual controller on AP3 730 receives the upstream unicast packet from client 710 through TCP/IP session S1 720, performs a source network address translation, changes the destination MAC address, and forwards the upstream unicast packet through TCP/IP session S2 740 to its destination. Meanwhile, the virtual controller creates session link 735 between TCP/IP session S1 720 and TCP/IP session S2 740. In some embodiments, session link 735 is stored, for example, in the form of a table, a list, or the like, by the virtual controller on AP3 730. Thus, when a downstream unicast packet is received through TCP/IP session S2 740 is received, AP3 730 can search for session link 735, retrieve the linked TCP/IP session S1 720 between AP3 730 and client 710, and forward the received downstream unicast packet through TCP/IP session S1 720 to client 710.

FIG. 7B is a sequence diagram illustrating exemplary downstream unicast packet transmission according to embodiments of the present disclosure. FIG. 7B includes client 710, AP1 732 which is the AP that client 710 is associated with, AP3 730 which is the AP that is elected as the virtual controller, and the web server hosting website 780. For illustration purposes, assuming that client 710 is assigned an IP address of "192.168.11.23;" AP1 732 is assigned an IP address of "192.168.11.4;" AP3 730 is assigned a VCIP address of "192.168.11.1" and a public IP address of "10.1.10.10."

During downstream unicast packet transmission process, downstream unicast packet 771 is transmitted from the web server hosting website 780, at time point $t_0$, to AP3 730. At time point $t_1$, AP3 730 acting as the virtual controller receives downstream unicast packet 771. Subsequently, the virtual controller on AP3 730 performs a destination NAT at time point $t_2$. More specifically, for illustration purposes only, in any downstream unicast packet in TCP/IP session S2 between AP3 730 and gateway (or web server hosting website 780), the source IP address will be 10.1.2.3, which is the IP address assigned to the web server; and the destination IP address will be 10.1.10.10, which is the VCIP address assigned to AP3 730.

To perform the destination NAT, the virtual controller retrieves the linked TCP/IP session S1, identifies the source IP address from the 5-tuple parameter of TCP/IP session s1, and changes the destination IP address in downstream unicast packet 773 to be the IP address retrieved from the source IP address in the linked TCP/IP session S1, e.g., 192.168.11.23.

In addition, because the virtual controller performs controller functionalities, the virtual controller is able to retrieve the MAC address of the access point that the client is associated with, i.e., the MAC address of AP1 732 as illustrated in FIG. 7B. Prior to forwarding downstream unicast packet 732 at time point $t_3$, and besides performing the destination NAT at time point $t_2$, the virtual controller also set the destination MAC address of downstream unicast packet 773 to be the MAC address of AP1 732. Also, because a network switch is a layer 2 device, any network switches connecting AP1 732 and AP3 730 will forward packets based on their MAC addresses. Therefore, downstream unicast packet 773 will be forwarded to AP1 732 by a switch connecting AP1 732 and AP3 730 (not shown) after the switch receives downstream unicast packet 773.

At time point $t_4$, AP1 732 receives downstream unicast packet 773, which is destined for client 710. Then, AP1 732 determines that client 710 is associated with the pre-configured VLAN on the plurality of APs, because client 710 is connected to AP1 732 on a guest network (e.g., SSID_Guest). Thus, AP1 732 will associate downstream unicast packet 774 destined to client 710 with the pre-configured VLAN; and therefore, AP1 can effectively separate network traffic on the guest network (e.g., SSID_Guest) from traffic on a different network such as a corporate network (e.g., SSID_Corp). Finally, AP1 732 will forward downstream unicast packet 774 to client 710; and, client 710 receives downstream unicast packet 774 at time point $t_5$.

FIG. 7C shows a table illustrating values of address fields in a downstream unicast packet during the packet delivery according to embodiments of the present disclosure. In some embodiments, the downstream unicast packet (as illustrated in FIG. 7C) includes at least the following fields: destination MAC address 791, source MAC address 792, destination IP address 793, source IP address 794, and so on.

In downstream unicast packet 771 transmitted to AP3 730, the value of destination MAC address 791 corresponds to the MAC address of AP3 730. The value of source MAC address 792 corresponds to the MAC address of the web server hosting website 780 (or the MAC address of a gateway if the web server is not on the same network with AP3 730). The value of destination IP address 793 corresponds to the public IP address of AP3 730, e.g., "10.1.10.10." The value of source IP address 794 corresponds to the IP address of the web server hosting website 780 (or the IP address of a gateway if the web server is not on the same network with AP3 730).

In this example, after AP3 730 performs the destination network address translation (NAT) 772, the value of destination IP address 793 is changed to the VCIP address, e.g., "192.168.11.1." Moreover, values of all other fields (including, but not limited to, destination MAC address 791, source MAC address 792, source IP address 794, etc.) remain the same as those in downstream unicast packet 771 respectively.

Next, in downstream unicast packet 773 transmitted from AP3 730 to AP1 732, the value of destination MAC address 791 corresponds to the MAC address of AP1 732. The value of source MAC address 792 corresponds to the MAC address of AP3 730. The value of destination IP address 793 corresponds to the IP address of AP1 732, e.g., "176.16.11.23." The value of source IP address 794 corresponds to the VCIP address of AP3 730, e.g., "192.168.11.1."

Finally, in downstream unicast packet 774 transmitted from AP1 732 to client 710, the value of destination MAC address 791 corresponds to the MAC address of AP1 732. The value of source MAC address 792 corresponds to the MAC address of AP3 730. The value of destination IP address 793 corresponds to the IP address of AP1 732, e.g., "176.16.11.23." The value of source IP address 794 corresponds to the VCIP address of AP3 730, e.g., "192.168.11.1."

Figure 8:
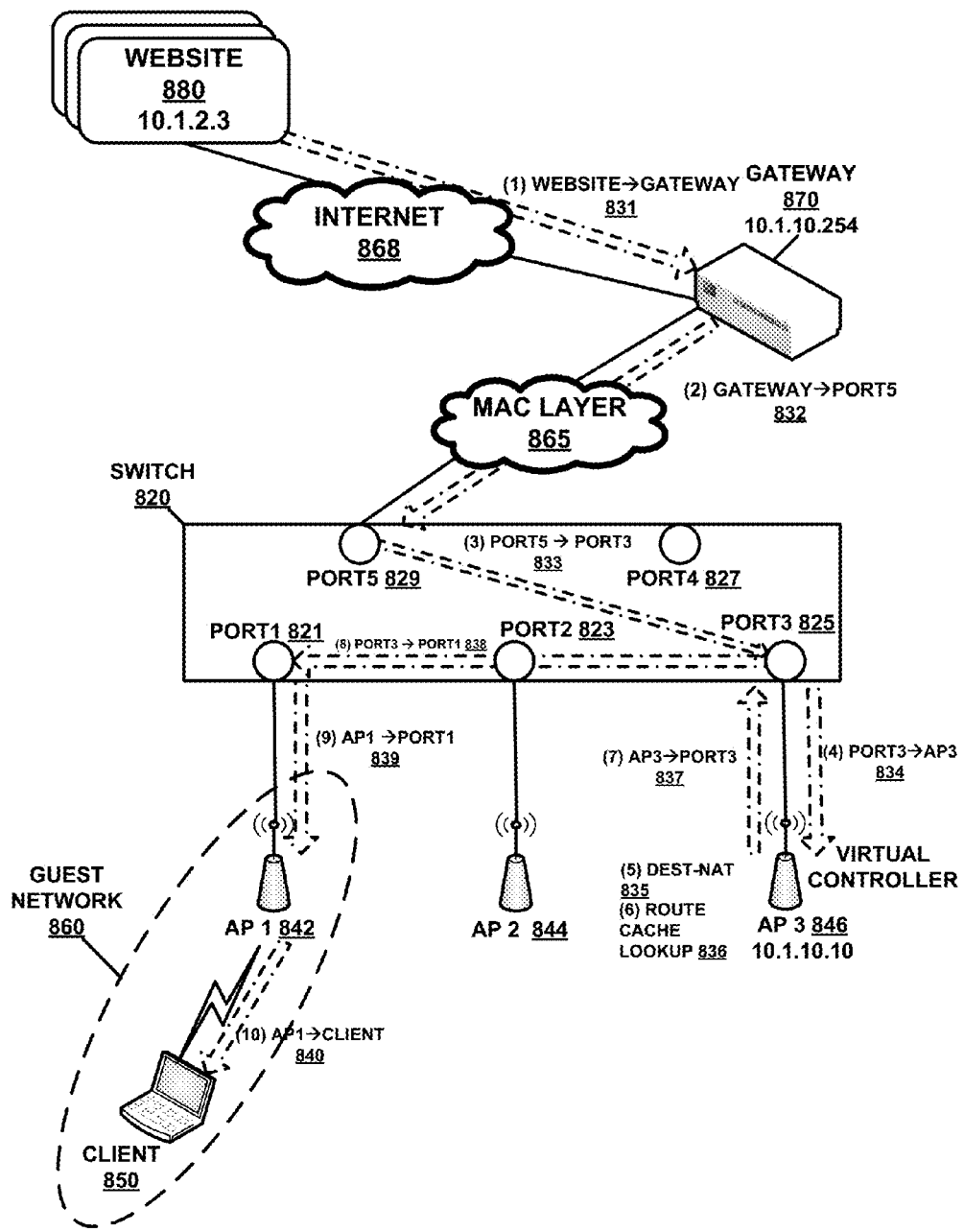
FIG. 8 is a block diagram illustrating exemplary downstream unicast packet delivery communication exchanges according to embodiments of the present disclosure.

FIG. 8 is a block diagram illustrating exemplary downstream unicast packet delivery communication exchanges according to embodiments of the present disclosure. FIG. 8 includes switch 820, a plurality of access points (e.g., AP1 842, AP2 844, AP3 846, etc.), and a plurality of clients including client 850. In addition, FIG. 8 includes gateway 870 that is interconnected via MAC layer network 865 with switch 820. Also, FIG. 8 includes website host 880 that is interconnected with gateway 870 via Internet 868.

Switch 820 includes a plurality of ports, such as, port 1 821, port 2 823, port 3 825, port 4 827, and port 5 829. A switch typically refers to a multi-port network bridge that processes and routes data at the data link layer (layer 2 of the OSI model). However, a switch may operate at other layers of the OSI model as well. In addition, a switch can operate simultaneously at more than one of the OSI layers (also known as a "multilayer switch"). Switch 820 may, but is not limited to, perform the following management features: turning a particular port range on or off; allowing link bandwidth and duplex settings; allowing priority settings for ports; enabling IP clustering; preventing Media Access Control (MAC) flooding via MAC filtering; using Spanning Tree Protocol; monitoring device and link health under Simple Network Management Protocol (SNMP); port mirroring; link aggregation; providing VLAN settings; providing IEEE 802.1X standard-based network access control; Internet Group Management Protocol (IGMP) snooping; etc.

Moreover, AP1 842, AP2 844, and/or AP3 846 can advertise guest network 860, which is identified by its unique service set identifier (SSID) SSID_Guest, for use by corporate guests. Meanwhile, each of the AP1 842, AP2 844, and AP3 846 may also advertise a corporate network (not shown), which is identified by its unique service set identifier (SSID) SSID_Corp, for use by corporate employees. Thus, client 850 on guest network 860 may be associated with the same access point, e.g., AP1 842, at the same time with another client on a different network.

In this example, assuming, for illustration purpose only, that AP1 842 is connected to port 1 821 of switch 820; AP2 844 is connected to port 823 of switch 820; AP3 846 is connected to port 3 825; and, gateway 870 is interconnected via MAC layer network 865 to port 5 829 of switch 820.

Furthermore, assuming, for illustration purpose only, that a DHCP service is hosted by the virtual controller on AP3 846. The DHCP service can automatically be configured with IP address scope "198.168.11.0/24," which is a non-conflicting scope of the DHCP address pool configured on another network DHCP server that assigns the IP address for AP3 846. Also, assuming that client 850 on guest network 860, which for example is identified by SSID_Guest, attempts to access website 880, which is hosted by a web server with IP address "10.1.2.3."

The downstream unicast packet transmission involves at least the following:

(1) Website 880's host server sends a downstream unicast packet to gateway 870 will then forward the upstream unicast packet to through Internet 868 (operation 831).

(2) The downstream unicast packet will be forwarded by gateway 870 via one or more MAC layer devices, such as switches, hubs, etc., to switch 820, which is connected to AP3 846 (operation 832). Note that AP3 846 is elected as the virtual controller among the plurality of APs including AP1 842, AP2 844, and AP3 846 in the illustrated example.

(3) After switch 820 receives the downstream unicast packet from gateway 870 via port 5 829, switch 620 switches the received packet to be transmitted on port 3 625 (operation 833), because port 3 629 is connected to AP3 846, which is the AP that matches the destination address in the downstream unicast packet received by switch 820 from gateway 870.

(4) Next, switch 820 will send the downstream unicast packet to AP3 846 which acts as the virtual controller (operation 834).

(5) After AP3 846 receives the downstream unicast packet, the virtual controller on AP3 846 performs a destination NAT (operation 835). The destination NAT replaces the value in the destination IP address field of the downstream unicast packet from 10.1.10.10 (AP3 846's public IP address) to 192.168.11.23 (the client's IP address assigned by the DHCP service hosted by the virtual controller on AP3 846).

(6) Upon receiving the downstream unicast packet from port 3 of switch 820, AP3 846 will determine a TCP/IP session S2 based on the received downstream unicast packet. Also, AP3 can retrieve the TCP/IP session S1 between client 850 and AP3 846, which is linked to the TCP/IP session S2, and further identify the destination IP address corresponding to client 850 in TCP/IP session S1. Moreover, AP3 846 can perform a route cache lookup to search for the MAC address corresponding to the AP that client 850 is associated with (operation 836). In this example, AP3 846 will find the MAC address corresponding to AP1 842 from the route cache lookup. Then, AP3 846 can change the value in the destination MAC address field of the downstream unicast packet from AP3's MAC address to the MAC address retrieved from the route cache lookup.

(7) Specifically, AP3 846 will send the downstream unicast packet to port 5 825 of switch 820 (operation 837). Note that, the downstream unicast packet that AP3 846 sends to switch 820 will have the value corresponding to AP1 842's MAC address in the destination MAC address field, and value corresponding to client 850's IP address in the destination IP address field.

(8) Next, because switch 820 is a layer 2 device, which switches and forwards incoming packets based on values in their destination MAC addresses, switch 820 will switch to transmit the downstream unicast packet received from port 3 825 (which is connected to AP3 846, i.e., the virtual controller) on port 1 821 (which is connected to AP1 842, i.e., the AP that client 850 is associated with) (operation 838).

(9) Switch 820 forwards the downstream unicast packet to AP1 842 on port 1 821, the port which AP1 842 is connected (operation 839).

(10) After AP1 842 receives the downstream unicast packet, AP1 842 identifies the destination IP address in the downstream unicast packet. In this example, AP1 842 is also able to determine that client 650 corresponding to the destination IP address of the downstream unicast packet is associated with AP1 on guest network 660 (e.g., SSID_Guest). Thus, AP1 842 will associate the downstream unicast packet with the pre-configured VLAN dedicated for network traffic on guest network, such as SSID_Guest, on the plurality of APs. Finally, AP1 842 can forward the downstream unicast packet to client 850 based on the destination address in the packet.

WLAN Partitioning Process

Figure 9:
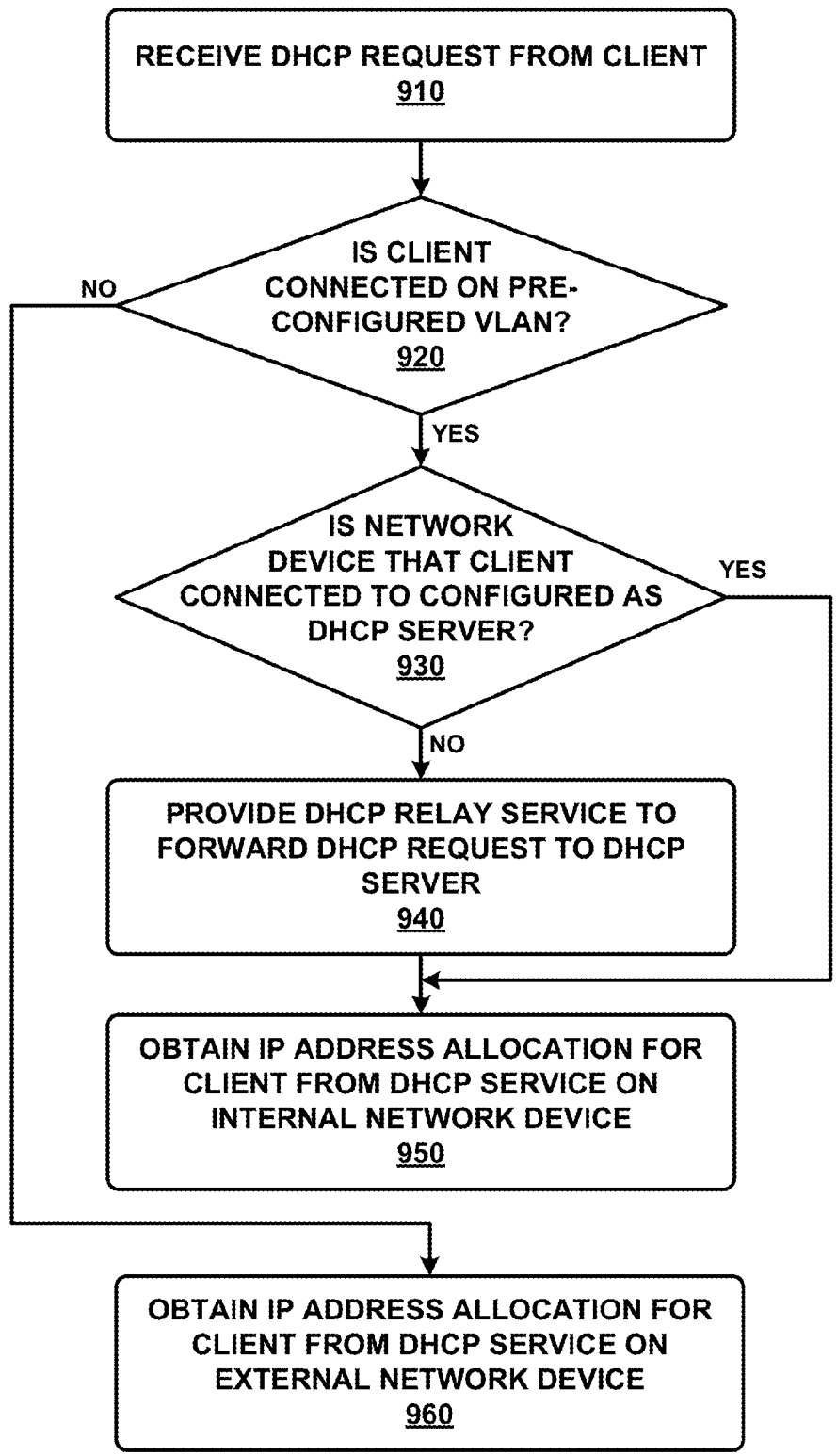
FIG. 9 is a flowchart illustrating DHCP communication exchanges on a pre-configured VLAN according to embodiments of the present disclosure.
Figure 10:
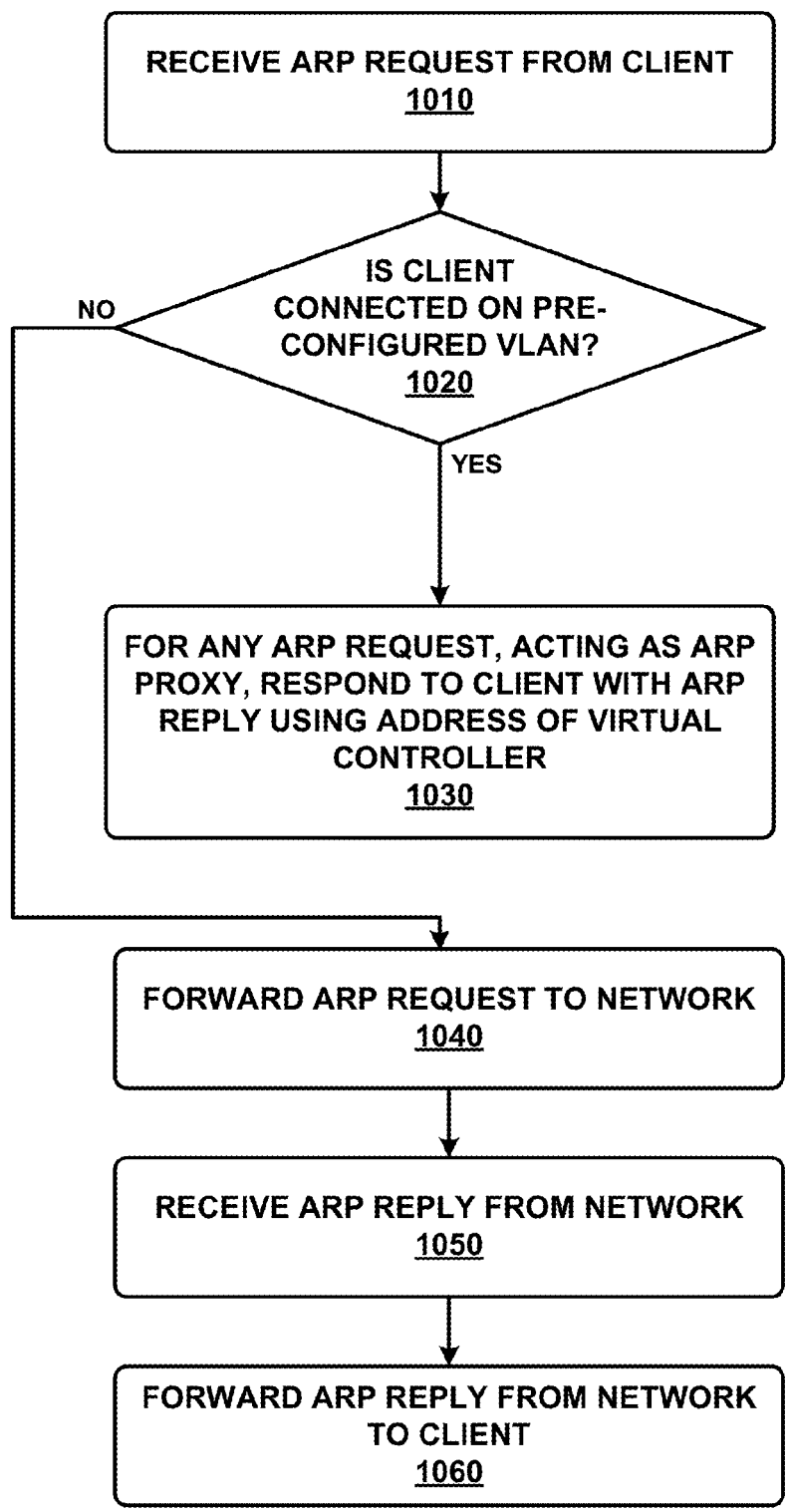
FIG. 10 is a flowchart illustrating ARP communication exchanges on a pre-configured VLAN according to embodiments of the present disclosure.
Figure 11:
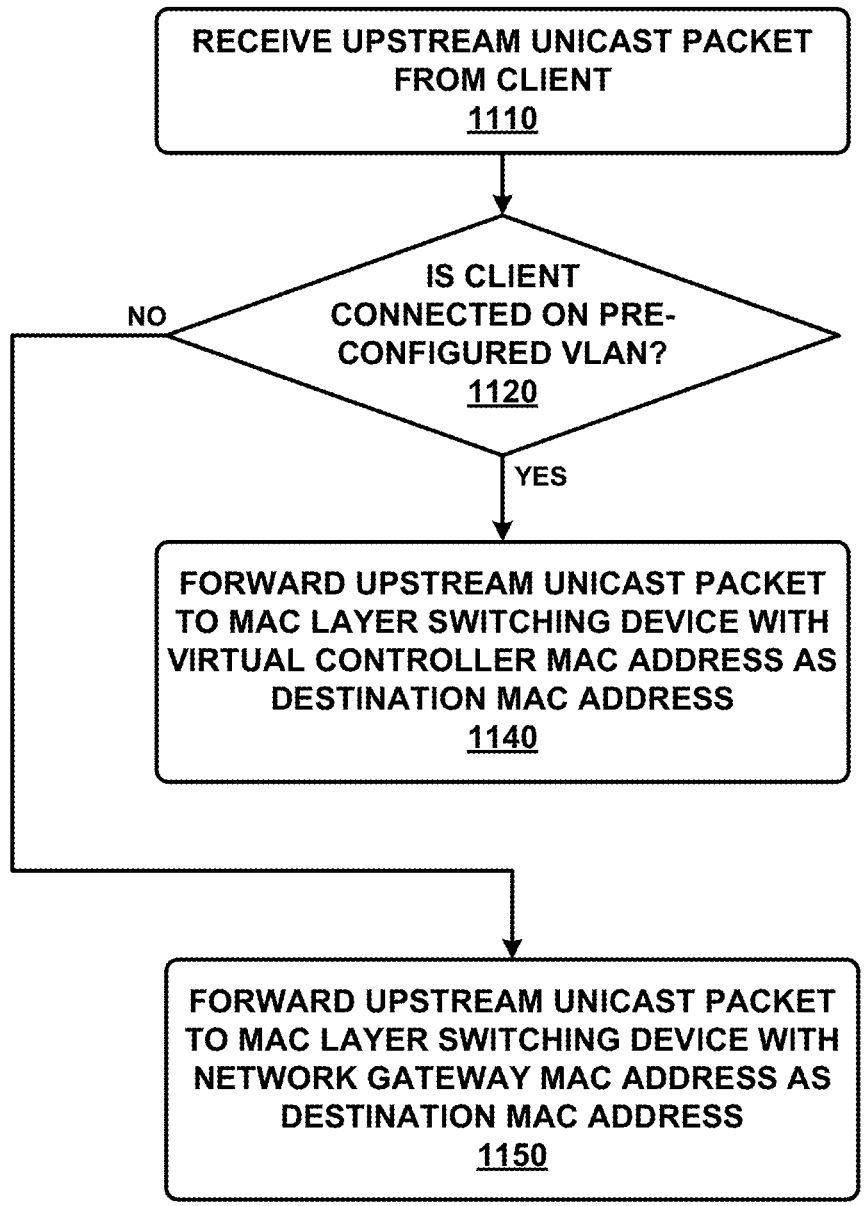
FIG. 11 is a flowchart illustrating upstream unicast packet communication exchanges on a pre-configured VLAN according to embodiments of the present disclosure.
Figure 12:
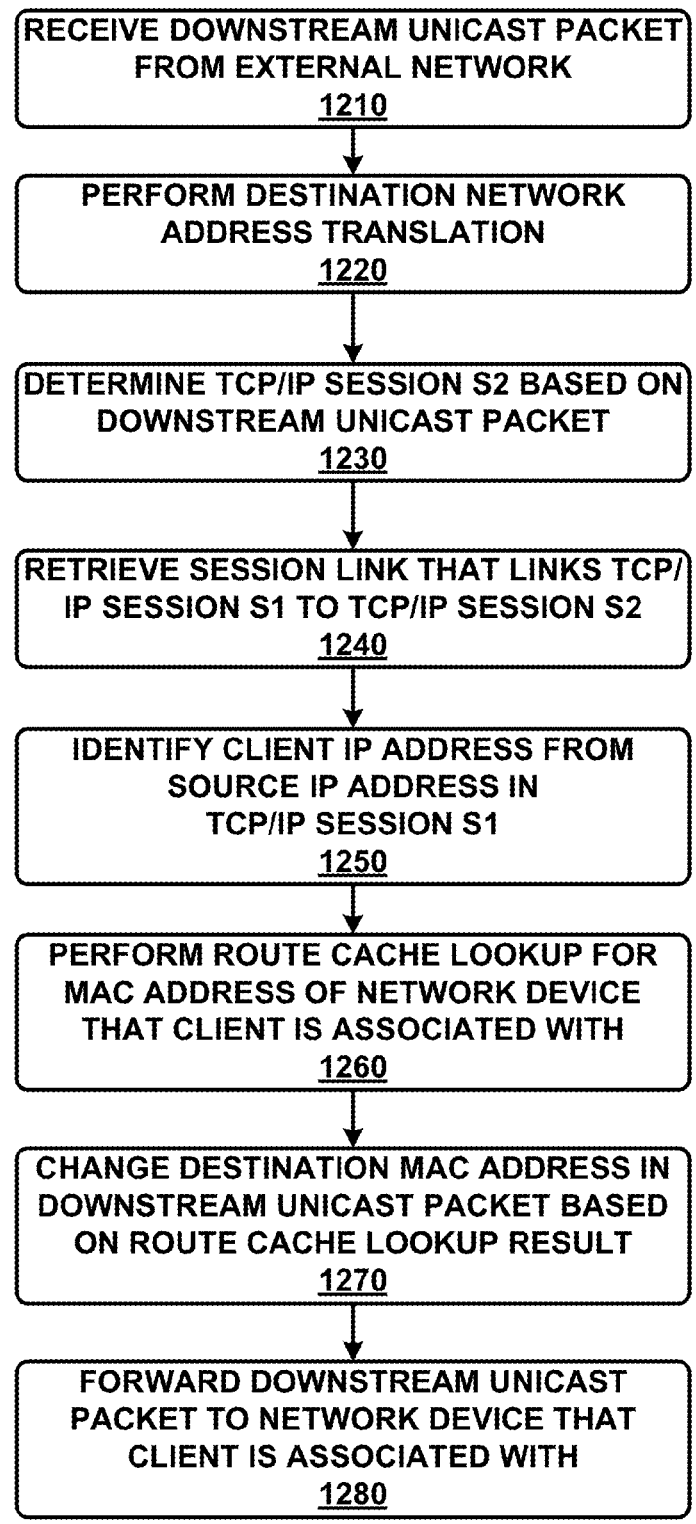
FIG. 12 is a flowchart illustrating downstream unicast packet communication exchanges on a pre-configured VLAN according to embodiments of the present disclosure.

FIGS. 9-12 are flow charts illustrating the WLAN partitioning process according to embodiments of the present disclosure. Specifically, FIG. 9 is a flowchart illustrating DHCP communication exchanges on a pre-configured VLAN (e.g., a VLAN pre-configured on an access point and dedicated for guest network traffic); FIG. 10 is a flowchart illustrating ARP communication exchanges on the pre-configured VLAN; FIG. 11 is a flowchart illustrating upstream unicast packet communication exchanges on the pre-configured VLAN; and, FIG. 12 is a flowchart illustrating downstream unicast packet communication exchanges on the pre-configured VLAN.

I. DHCP Communication Exchange Process on Pre-Configured VLAN

FIG. 9 is a flowchart illustrating exemplary DHCP communication exchanges on a pre-configured VLAN (e.g., a VLAN pre-configured on an access point and dedicated for guest network traffic). During the DHCP communication exchange process, a network device receives a DHCP request from a client (operation 910). The network device then determines whether the client from whom the DHCP request is originated is connected on a network corresponding to a pre-configured VLAN (operation 920). Note that, the pre-configured VLAN is configured on a plurality of APs, but not other network devices (such as switches, routers, etc.) in the network. The pre-configured VLAN can be dedicated for use by a specific network, e.g., a guest network, in order to separate network traffic on the specific network from other networks.

If the client is connected on a network corresponding to the pre-configured VLAN, the network device determines whether the network device that the client connected to serves as a DHCP server (operation 930). If the network device serves as the DHCP server, then the network device obtains an IP address allocation from the DHCP service on an internal network device, e.g., an AP in the plurality of APs (operation 950). If the network device does not serve as a DHCP server, the network device provides a DHCP relay service to forward DHCP request to DHCP server (operation 940); and subsequently, obtains an IP address allocation from the DHCP service on an internal network device, e.g., an AP in the plurality of APs (operation 950).

On the other hand, if the client is not connected on the network corresponding to the pre-configured VLAN, the network device will obtain the IP address allocation for the client from a DHCP service on an external network device, such as a network DHCP server (operation 960).

In some embodiments, the network device may alternatively obtain the IP address allocation for the client from the internal network device that provides the DHCP service. However, the allocated IP address may be belong to a different IP address scope corresponding to a different sub-network from the sub-network of the pre-configured VLAN.

II. ARP Communication Exchange Process on Pre-Configured VLAN

FIG. 10 is a flowchart illustrating exemplary ARP communication exchanges on the pre-configured VLAN. During the ARP communication exchange process, a network device receives an ARP request packet from the client (operation 1010). Furthermore, the network device determines whether the client is connected on a network corresponding to a pre-configured VLAN on the network device (operation 1020). Note that, the pre-configured VLAN is configured on a plurality of APs, but not other network devices (such as switches, routers, etc.) in the network. The pre-configured VLAN can be dedicated for use by a specific network, e.g., a guest network, in order to separate network traffic on the specific network from other networks.

If the client is connected on the network corresponding to the pre-configured VLAN, the network device will act as an ARP proxy, which responds to client's ARP request packet with an ARP reply packet. Moreover, for any incoming APR request packets, the network device will reply using the MAC address of a network device acting as the virtual controller (operation 1030). Note that, a virtual controller is capable of performing MAC functionalities typically performed by a network controller device, but resides on a low-cost access point instead of network controller device. In some embodiments, a plurality of access points in a network may elect one or more access points to act as the virtual controller and to perform controller functionalities. In some embodiments, the virtual controller is associated with a virtual controller IP (VCIP) address. In some embodiments, when one access point acting as the virtual controller fails, another access point in the plurality of access points within the same VLAN will be elected as the virtual controller and will be using the same VCIP address.

If, however, the client is not connected on the network corresponding to the pre-configured VLAN, then the network device may optionally search its ARP cache (if any) for the requested MAC address, or forward the ARP request to network (operation 1040).

Subsequently, the network device may receive an ARP reply from the network (operation 1050). After receipt of the ARP reply, the network device forwards the ARP reply to the client (operation 1060).

III. Upstream Unicast Packet Communication Exchange Process on Pre-Configured VLAN FIG. 11 is a flowchart illustrating exemplary upstream unicast packet communication exchanges on the pre-configured VLAN. During the upstream unicast packet communication exchanges, a network device receives an upstream unicast packet from the client (operation 1110). Furthermore, the network device determines whether the client is connected on a network corresponding to a pre-configured VLAN on the network device (operation 1120). If so, the network device forwards, to a MAC layer switching device, the upstream unicast packet having a virtual controller's MAC address as the destination MAC address (operation 1140). Note that, in the upstream unicast packet, the destination IP address is not the virtual controller's IP address. Rather, the destination IP address corresponds to the IP address of the destination of the TCP/IP packet, e.g. a web server hosting a website that the client attempts to access. If the client is not connected on the network corresponding to the pre-configured VLAN on the network device, the network device forwards, to the MAC layer switching device, the upstream unicast packet having a network gateway's MAC address as the destination MAC address (operation 1150).

IV. Downstream Unicast Packet Communication Exchange Process on Pre-Configured VLAN FIG. 12 is a flowchart illustrating exemplary downstream unicast packet communication exchanges on the pre-configured VLAN. During the downstream unicast packet communication exchanges, a network device receives an upstream unicast packet from the client (operation 1210). Also, the network device performs a destination network address translation (operation 1220), which translates the destination IP address in the downstream unicast packet, e.g., from an external public IP address to an internal private IP address. Moreover, the network device determines a TCP/IP session S2 based on the downstream unicast packet (operation 1230). Then, the network device retrieves a session link that links TCP/IP session S1 to TCP/IP session S2 (operation 1240), and identifies the client's IP address from the source IP address field in the TCP/IP session S1's 5-tuple parameter (operation 1250). Further, the network device performs a route cache lookup and searches for the MAC address of the network device that the destination client is associated with (operation 1260). Based on the route cache lookup result, the network device changes the destination MAC address in the downstream unicast packet (operation 1270). Finally, the network device forwards the downstream unicast packet, whose destination MAC address includes the MAC address of the network device that the destination client is associated with, and whose destination IP address includes the IP address of the client retrieved from TCP/IP session S1 (operation 1280).

WLAN Partitioning System

Figure 13:
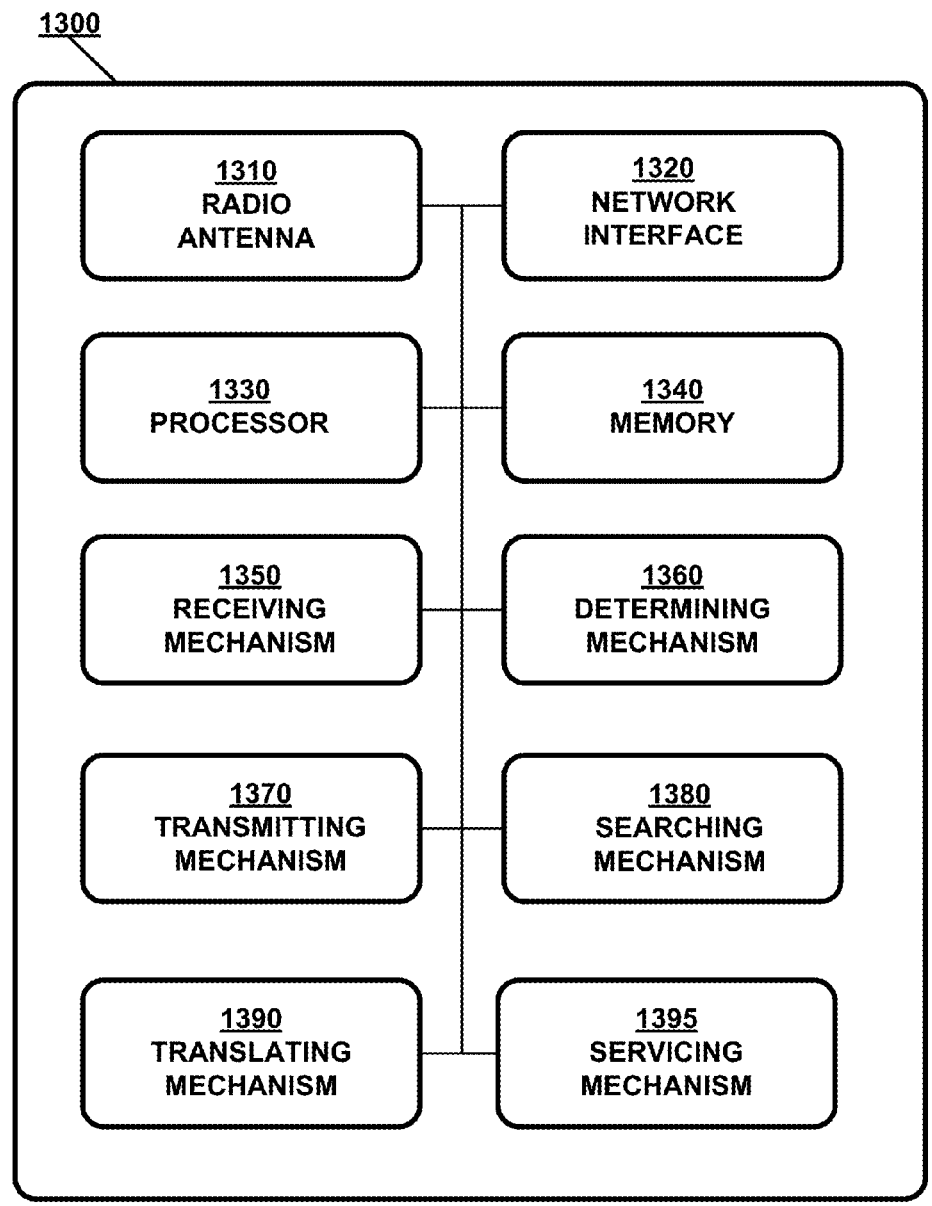
FIG. 13 is a block diagram illustrating a system for partitioning WLAN without VLAN creation according to embodiments of the present disclosure.

FIG. 13 is a block diagram illustrating a system for partitioning WLAN without VLAN creation according to embodiments of the present disclosure. Operating as a node in an access network, network device 1300 includes at least one or more radio antennas 1310 capable of either transmitting or receiving radio signals or both, a network interface 1320 capable of communicating to a wired or wireless network, a processor 1330 capable of processing computing instructions, and a memory 1340 capable of storing instructions and data. Moreover, network device 1300 further includes a receiving mechanism 1350, a determining mechanism 1360, a transmitting mechanism 1370, a searching mechanism 1380, a translating mechanism 1390, and a servicing mechanism 1395, all of which operates with processor 1330 and memory 1340 in network device 1300. Network device 1300 may be used as a client system, or a server system, or may serve both as a client and a server in a distributed or a cloud computing environment.

Radio antenna 1310 may be any combination of known or conventional electrical components for receipt of signaling, including but not limited to, transistors, capacitors, resistors, multiplexers, wiring, registers, diodes or any other electrical components known or later become known.

Network interface 1320 can be any communication interface, which includes but is not limited to, a modem, token ring interface, Ethernet interface, wireless IEEE 802.11 interface, cellular wireless interface, satellite transmission interface, or any other interface for coupling network devices.

Processor 1330 can include one or more microprocessors and/or network processors. Memory 1340 can include storage components, such as, Dynamic Random Access Memory (DRAM), Static Random Access Memory (SRAM), etc.

Receiving mechanism 1350 receives a packet from a client connected to the network device 1300 on an access network. Furthermore, receiving mechanism 1350 also receives a downstream packet via a first connection session. Note that, the downstream packet is associated with a VLAN that is pre-configured on network device 1300.

Determining mechanism 1360 determines that the packet is associated with a VLAN that is pre-configured on network device 1300 based on the access network that the client is connected to. In some embodiments, in response to receiving mechanism 1350 receiving a downstream packet, determining mechanism 1360 can also determine a connection session based on the received downstream packet. In other embodiments, in response to receiving mechanism 1350 receiving a downstream packet, determining mechanism 1360 further identifies an IP address that uniquely identifies the client based on a source IP address attribute corresponding to the second connection session. The downstream packet can include the identified IP address and the MAC address resulting from searching the route cache performed by searching mechanism 1380.

Transmitting mechanism 1370 transmits the packet to a MAC layer switching device. Note that, the VLAN pre-configured on network device 1300 is not configured on the MAC layer switching device.

Searching mechanism 1380 retrieves a second connection session based on the first connection session. The second connection session connects a client with network device 1300. In some embodiments, in response to receiving mechanism 1350 receiving a downstream packet, searching mechanism 1380 further retrieves a stored session link that associates the first connection session with the second connection session. In other embodiments, searching mechanism 1380 searches in a route cache for the MAC address corresponding to the second network device, where network device 1300 and the second network device are connected through the MAC layer switching device.

Translating mechanism 1390 sets a Media Access Control (MAC) address corresponding to a second network device that the client is connected to as a destination MAC address in the downstream packet. In some embodiments, translating mechanism 1390 performs a destination network address translation (NAT) prior to transmitting mechanism 1370 transmits the packet to the MAC layer switching device.

In addition, according to embodiments of the present disclosure, the wireless network is associated with a unique basic service set identifier (BSSID). The client can be connected to the network device via either a wired port or a wireless port. The packet can include an Internet Protocol (IP) address within a first IP sub-network address scope assigned to the client by another network device. Moreover, the other network device can host a Dynamic Host Configuration Protocol (DHCP) service. Also, the other network device could be assigned a different IP address within a non-overlapping IP sub-network address scope compared to the first IP sub-network address scope. The packet can be transmitted on a native VLAN by the MAC layer switching device.

In some embodiments, network device 1300 and the other network device belong to the same cluster of network devices, where each network device in the cluster provides a common subset of services for a plurality of clients. The other network device can be configured as a default gateway for the clients connected to the cluster of network devices. Network device 1300 can be configured to provide a DHCP relay service. Network device 1300 can also be configured to provide an ARP proxy service. The packet may be one of a DHCP discovery message (e.g., a DHCPDiscover request), an ARP request message, a unicast message, a multicast message, and/or a broadcast message. The ARP request message may include a network layer address (e.g., IP address) which corresponds to a different network device from the other network device. Moreover, the unicast message can be transmitted to the other network device on the pre-configured VLAN prior to being transmitted to another network device which is outside the pre-configured VLAN.

Hence, receiving mechanism 1350, determining mechanism 1360, transmitting mechanism 1370, searching mechanism 1380, translating mechanism 1390, and servicing mechanism 1395 collectively operate with each other to accomplish WLAN partition. Moreover, the above mechanisms may be operating with each other in the same or different software and/or hardware components.

According to embodiments of the present disclosure, network services provided by wireless network device 1300, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   receiving, by a first network device, a Dynamic Host Configuration Protocol (DHCP) request packet from a client connected to the first network device on an access network;
   determining, by the first network device, whether the client is connected on the access network corresponding to a pre-configured virtual local access network (VLAN), wherein the pre-configured VLAN is configured on a plurality of access points but not on network devices, including the first network device, in the access network, and wherein the first network device, the pre-configured VLAN, and the plurality of access points are associated with the same access network;
   electing, from among the plurality of access points, an access point to act as a virtual controller of the pre-configured VLAN;
   in response to a determination that the client is connected on the access network corresponding to the pre-configured VLAN, determining, by the first network device, whether the first network device is configured as a DHCP server, wherein the first network device replaces a pre-configured VLAN identifier tag on the request packet with an identifier tag corresponding with a native VLAN, and wherein the first network device forwards the request packet onto a native VLAN; and
   in response to a determination that the first network device is configured as a DHCP server, obtaining, by the first network device, an Internet Protocol (IP) address allocation for the client from a DHCP service that is on an internal network device of the access network.

2. The method of claim 1, wherein the access network is associated with a unique basic service set identifier (BSSID).

3. The method of claim 1, further comprising:
   in response to a determination that the client is not connected on the access network corresponding to the pre-configured VLAN, obtaining, by the first network device, the IP address allocation for the client from a DHCP service that is external to the access network.

4. The method of claim 1, further comprising:
   in response to a determination that the first network device is not configured as a DHCP server, providing, by the first network device, a DHCP relay service to forward the DHCP request packet to a DHCP server.

5. The method of claim 1,
   wherein the DHCP request packet comprises a first Internet Protocol (IP) address within a first IP sub-network address scope assigned to the client by a second network device hosting a DHCP service; and
   wherein the second network device is assigned a different IP address within a non-overlapping IP sub-network address scope compared to the first IP sub-network address scope.

6. The method of claim 5,
   wherein the first network device and the second network device belong to a cluster of network devices; and
   wherein each network device in the cluster of network devices provides a common subset of services for a plurality of clients.

7. The method of claim 6, wherein the second network device is configured to act as a default gateway for the plurality of clients connected to the cluster of network devices.

8. The method of claim 6, wherein the first network device is further to provide an Address Resolution Protocol (ARP) proxy service.

9. The method of claim 8, further comprising receiving, by the first network device, an ARP request message that comprises a network layer address which corresponds to another network device that is different from the second network device.

10. The method of claim 5, further comprising receiving, by the first network device, a unicast message that is transmitted to the second network device on the pre-configured VLAN prior to being transmitted to another network device which is outside the pre-configured VLAN.

11. A network device comprising:
    a processor;
    a memory on which is stored instructions that are to cause the processor to:
    receive an Address Resolution Protocol (ARP) packet from a client connected to the network device on an access network;
    determine whether the client is connected on the access network corresponding to a pre-configured virtual local access network (VLAN), wherein the pre-configured VLAN is configured on a plurality of access points but not on network devices, including the network device, in the access network, and wherein the first network device, the pre-configured VLAN, and the plurality of access points are associated with the same access network;

elect, from among the plurality of access points, an access point to act as a controller, wherein when the access point acting as the controller fails, another access point from among the plurality of access points is elected to act as the controller;

in response to a determination that the client is connected on a network corresponding to the pre-configured VLAN, act as an ARP proxy that responds to the ARP request packet with an ARP reply packet, wherein the ARP reply packet includes the Media Access Control (MAC) address of a virtual controller, and wherein the virtual controller is a default gateway for clients on the pre-configured VLAN; and in response to a determination that the client is not connected on the access network corresponding to the pre-configured VLAN, search an ARP cache for a requested Media Access Control (MAC) address and forward the ARP request to the access network.

12. The network device of claim 11, wherein the access network is associated with a unique basic service set identifier (BSSID).

13. The network device of claim 11, wherein the instructions are further to cause the processor to receive an ARP reply from the access network and to forward the ARP reply to the client.

14. The network device of claim 11, wherein in response to a determination that the client is connected on a network corresponding to the pre-configured VLAN, the instructions are further to cause the processor to reply to the ARP request using a MAC address of the network device acting as a virtual controller.

15. The network device of claim 11,
wherein the ARP packet comprises a first Internet Protocol (IP) address within a first IP sub-network address scope assigned to the client by a second network device hosting a Dynamic Host Configuration Protocol (DHCP) service; and
wherein the second network device is assigned a different IP address within a non-overlapping IP sub-network address scope compared to the first IP sub-network address scope.

16. The network device of claim 15,
wherein the network device and the second network device belong to a cluster of network devices; and
wherein each network device in the cluster of network devices provides a common subset of services for a plurality of clients.

17. The network device of claim 16, wherein the second network device is configured to act as a default gateway for the plurality of clients connected to the cluster of network devices.

18. The network device of claim 16, wherein the network device is configured to provide a DHCP relay service.

19. A non-transitory computer-readable storage medium storing embedded instructions that, when executed by one or more processors in a network device, cause the one or more processors to:

receive a unicast packet from a client connected to the network device on an access network;

determine whether the client is connected on a network corresponding to a pre-configured virtual local access network (VLAN), wherein the pre-configured VLAN is configured on a plurality of access points but not on network devices in the access network, including the network device, and wherein the first network device, the pre-configured VLAN, and the plurality of access points are associated with the same access network;

elect, from among the plurality of access points, an access point to act as a controller associated with a virtual controller IP (VCIP) address, wherein when the access point acting as the controller fails, another access point from among the plurality of access points is elected to act as the controller associated with the same VCIP address;

in response to a determination that the client is connected on a network corresponding to the pre-configured VLAN, forward the unicast packet to a Media Access Controller (MAC) layer switching device with the unicast packet having a virtual controller's MAC address as a destination MAC address, wherein, upon receipt of the unicast packet, the virtual controller changes values in the destination MAC address and sends the unicast packet to a network gateway, and wherein the network gateway sends the received unicast packet to a host server; and in response to a determination that the client is not connected on a network corresponding to the pre-configured VLAN, forward the unicast packet to the MAC layer switching device with the unicast packet having the network gateway's MAC address as the destination MAC address.

* * * * *